United States Patent
Kuwahara et al.

(10) Patent No.: US 7,058,457 B2
(45) Date of Patent: Jun. 6, 2006

(54) HOT WATER SUPPLY SYSTEM

(75) Inventors: Hirokazu Kuwahara, Kobe (JP); Hiroyuki Tada, Kobe (JP); Hidekazu Fukui, Kobe (JP); Takehiro Kurihara, Kobe (JP); Masayoshi Murakami, Kobe (JP); Yoshikazu Hamatani, Kobe (JP); Shigemasa Matsugu, Kobe (JP); Masatsugu Yano, Kobe (JP); Tadahiko Ooshio, Kobe (JP)

(73) Assignee: Noritz Corporation, Hyogo (JP)

( * ) Notice: Subject to any disclaimer, the term of this patent is extended or adjusted under 35 U.S.C. 154(b) by 478 days.

(21) Appl. No.: 10/377,798

(22) Filed: Mar. 4, 2003

(65) Prior Publication Data

US 2004/0176858 A1   Sep. 9, 2004

(51) Int. Cl.
*G05B 15/02* (2006.01)
(52) U.S. Cl. ............................ 700/9; 700/11; 700/12; 700/15; 700/19; 700/20; 700/21; 700/26
(58) Field of Classification Search ............... 700/9, 700/11, 12, 15, 19, 20, 21, 26, 27
See application file for complete search history.

(56) References Cited

U.S. PATENT DOCUMENTS

| | | | |
|---|---|---|---|
| 6,600,971 B1 * | 7/2003 | Smith et al. | 700/284 |
| 6,615,087 B1 * | 9/2003 | Kanai | 700/9 |
| 6,845,410 B1 * | 1/2005 | Brown et al. | 710/29 |
| 6,898,467 B1 * | 5/2005 | Smith et al. | 700/20 |
| 2005/0033455 A1 * | 2/2005 | Kasdan et al. | 700/12 |

FOREIGN PATENT DOCUMENTS

| | | | |
|---|---|---|---|
| JP | 11018169 A | * | 1/1999 |
| JP | 2002071217 A | * | 3/2002 |
| JP | 2002098404 A | * | 4/2002 |

* cited by examiner

*Primary Examiner*—Anthony Knight
*Assistant Examiner*—Thomas Pham
(74) *Attorney, Agent, or Firm*—Rader, Fishman & Grauer

(57) ABSTRACT

A hot water supply system operated by linking plural water heaters. A system controller is provided in every specific number of water heaters for centralizing controls thereof. A host system controller is further provided in every specific number of the system controllers for centralizing controls thereof, and finally the controls are centralized in one highest system controller. In this configuration, therefore, the highest system controller controls the operation of individual water heaters by way of the lower system controllers.

29 Claims, 15 Drawing Sheets

Fig. 9A

Total tapping capacity

Operating number

Fig. 9D sub 1

4 − 3 ← x

↖ y

Fig. 9E sub 2

— — —

↘ z

HOT WATER SUPPLY SYSTEM

BACKGROUND OF THE INVENTION

1. Field of the Invention

The present invention relates to a hot water supply system, and more particularly to a technology for meeting the need of supply of a large volume of hot water by connecting water heaters.

2. Description of the Related Art

Generally in a facility demanding supply of a large volume of hot water, a hot water supply system is installed as shown in FIG. 15, in which a plurality of water heaters (a) are connected in parallel, and the operation of these water heaters (a) is controlled centrally by a system controller (g).

The water heater (a) used in such hot water supply system comprises a heat exchanger (c) for heating the water supplied from an inlet pipe (b), and a tapping flow rate regulating valve (e) for regulating the tapping flow rate of hot water heated by the heat exchanger (c) to a tapping pipe (d), and when the water passing rate form the inlet pipe (b) exceeds a specified flow rate, a control unit (f) ignites a burner (not shown) for heating the heat exchanger, thereby heating the heat exchanger (c) to produce hot water.

The tapping temperature from the water heater (a) is determined on the basis of the hot water supply set temperature. The control unit (f) of the water heater (a) controls the valve opening degree of the flow rate regulating valve (e) depending on the tapping amount from a faucet (i), and also controls the combustion amount of the burner so that the tapping temperature from the water heater (a) may coincide with the hot water supply set temperature. The faucet (i) is a combination faucet of hot and cold water, and by this combination faucet, the tapping temperature from the faucet (i) can be finely adjusted.

In construction of the system, a passage opening and closing valve (h) is provided in the tapping side piping of each water heater (a). The system controller (g) regulates the number of operating units of water heaters by controlling the opening or closing of this passage opening and closing valve (h). The control unit (f) of the water heater and the system controller (g) are designed to communicate with each other, and the control information such as the hot water set temperature is supplied from the system controller (g) to the control unit (f) of the water heater, while the instrument information such as operating state of the water heater (a) is supplied from the control unit (f) of the water heater to the system controller (g).

Thus, when managing the system, first of all, the system controller (g) opens the passage opening and closing valve (h) provided in one of the water heaters (while the passage opening and closing valves of the other water heaters are closed), and this water heater (a) is set in waiting state for operation. In this state, when the faucet (i) is opened, water is passed into the water heater (a) in waiting state, and tapping is started from the water heater (a) at the hot water supply set temperature.

As the tapping amount from the faucet (i) increases, when the tapping demand from the faucet (i) cannot be satisfied by one water heater (a) only, the system controller (g) detects such state by communication with the control unit (f) of the water heater, and opens the passage opening and closing valve (h) of the second water heater (a), thereby starting operation of the second water heater.

Similarly, thereafter, when the tapping demand cannot be satisfied by operating the second water heater (a), the passage opening and closing valve (h) of the third water heater (a) is opened, thereby starting operation of the third water heater (a).

Thus, along with the increase in the tapping amount of the faucet (i), the system controller (g) meets the demand for supply of a larger volume of hot water by increasing the number of operating units of the water heaters (a).

In the recent technical innovation and the trend for diversified and comfortable living environments, stable supply of larger volume of hot water is demanded in the hot water supply system.

BRIEF SUMMARY OF THE INVENTION

It is hence a primary object of the invention to present a novel hot water supply system solving problems of the prior art.

It is other object of the invention to present a novel hot water supply system, completely different from a conventional hot water supply system, by using plural system controllers with the aid of data communication technology.

It is a different object of the invention to present a hot water supply system easy in maintenance by central management of system configuration and operating status by a highest host system controller, by disposing system controllers hierarchically and centralizing controls of water heaters in host system controllers.

It is a further different object of the invention to present a hot water supply system capable of supplying hot water safely and stably in case of trouble in part of water heaters or system controllers, in a hot water supply system disposing system controllers hierarchically and centralizing controls of water heaters in host system controllers.

The configuration of a hot water supply system of the invention is a hot water supply system operated by linking plural water heaters, comprising system controllers centralizing controls of a group of water heaters, and host system controllers centralizing controls of a group of system controllers, in which the host system controllers are disposed hierarchically so that the controllers may be finally centralized in a single highest host system controller, and the highest host system controller controls the operation of individual water heaters through the host system controllers.

In the basic composition of operation of the hot water supply system of the invention, the lower system controllers to which water heaters are connected are designed to increase or decrease the number of operating units of a group of water heaters under the control depending on the tapping request, while the highest host system controller controls the number of operating units of water heaters in the entire system by increasing or decreasing the number of operating units of lower system controllers.

These and other objects and features of the invention will be better understood by reading the following detailed description with accompanying drawings and novel facts indicated in the claims thereof.

BRIEF DESCRIPTION OF THE DRAWINGS

FIG. 9(a) shows an example of display of hot water supply capacity in display unit of the hot water supply system.

FIG. 9(b) shows an example of display of number of operating units of water heaters during operation in display unit of the hot water supply system.

FIG. 9(c) shows an example of fault display of water heater in display unit of the hot water supply system.

FIG. 9(d) shows an example of communication trouble display of water heater in display unit of the hot water supply system.

FIG. 9(e) shows an example of communication trouble display of system controller in display unit of the hot water supply system.

DETAILED DESCRIPTION OF THE PREFERRED EMBODIMENTS

Figure 1:
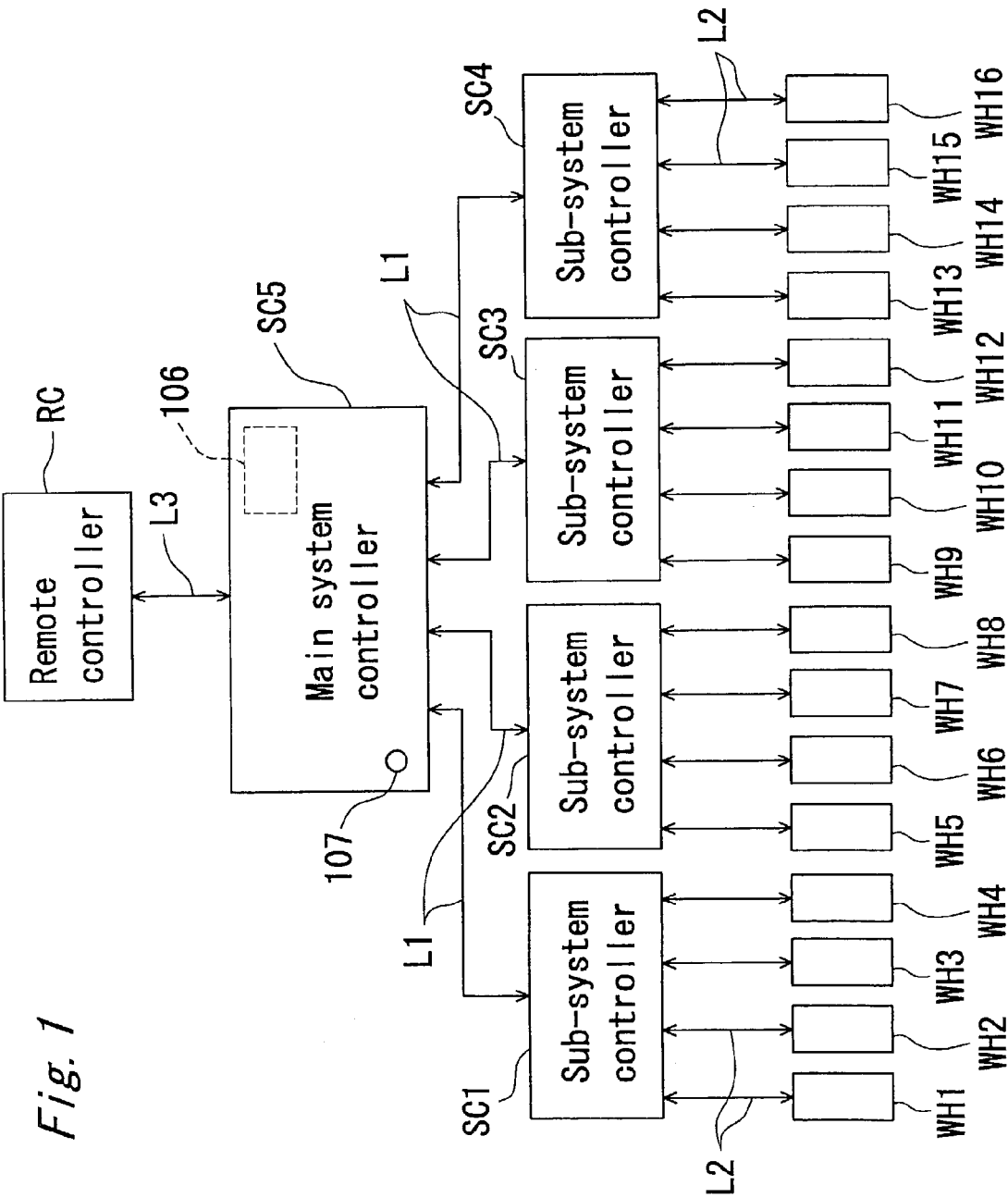
FIG. 1 is a block diagram showing a schematic configuration of a hot water supply system in embodiment 1 of the invention.

A preferred embodiment of the invention is described in detail below while referring to the accompanying drawings.

FIG. 1 to FIG. 14 show the hot water supply system of the invention, and same reference numerals throughout the drawings represent same constituent members or elements.

The hot water supply system of the embodiment is shown in FIG. 1 to FIG. 14. This hot water supply system is a system for linking and managing a plurality of water heaters, and mainly comprises, as shown in FIG. 1, a plurality of (sixteen in the illustrated example) water heaters WH, and a plurality of (five in the illustrated example) system controllers SC.

Figure 2:
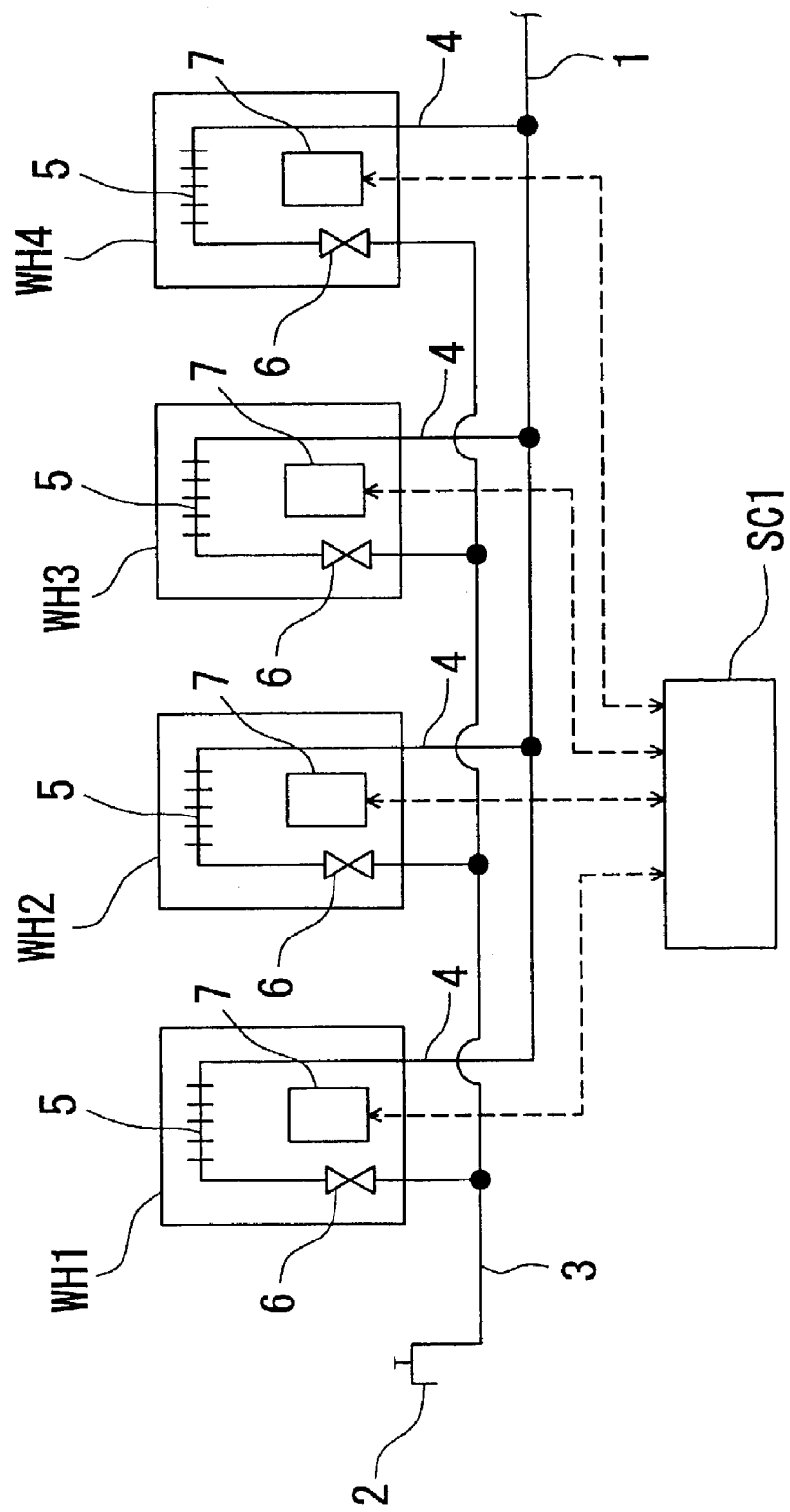
FIG. 2 is an explanatory diagram showing a schematic configuration of water heaters in the hot water supply system and mutual connection status of water heaters.

The individual water heaters WH1 to WH16 are connected in parallel as shown in FIG. 2, between incoming pipes 1 of which pipe ends are connected to city water works, and tapping pipes 3 of which pipe ends are connected to faucets 2 of sink or shower, by way of distribution pipings 4.

Each one of the water heaters WH1 to WH16 mainly comprises a heat exchanger 5 for heating the water supplied from the incoming pipe 1, a flow rate control valve 6 for controlling the tapping flow rate to the tapping pipe 3 and changing over passing (passing) and stopping of supply to the tapping pipe 3, and a control unit 7 for controlling the operation of the parts of the water heater.

Figure 4:
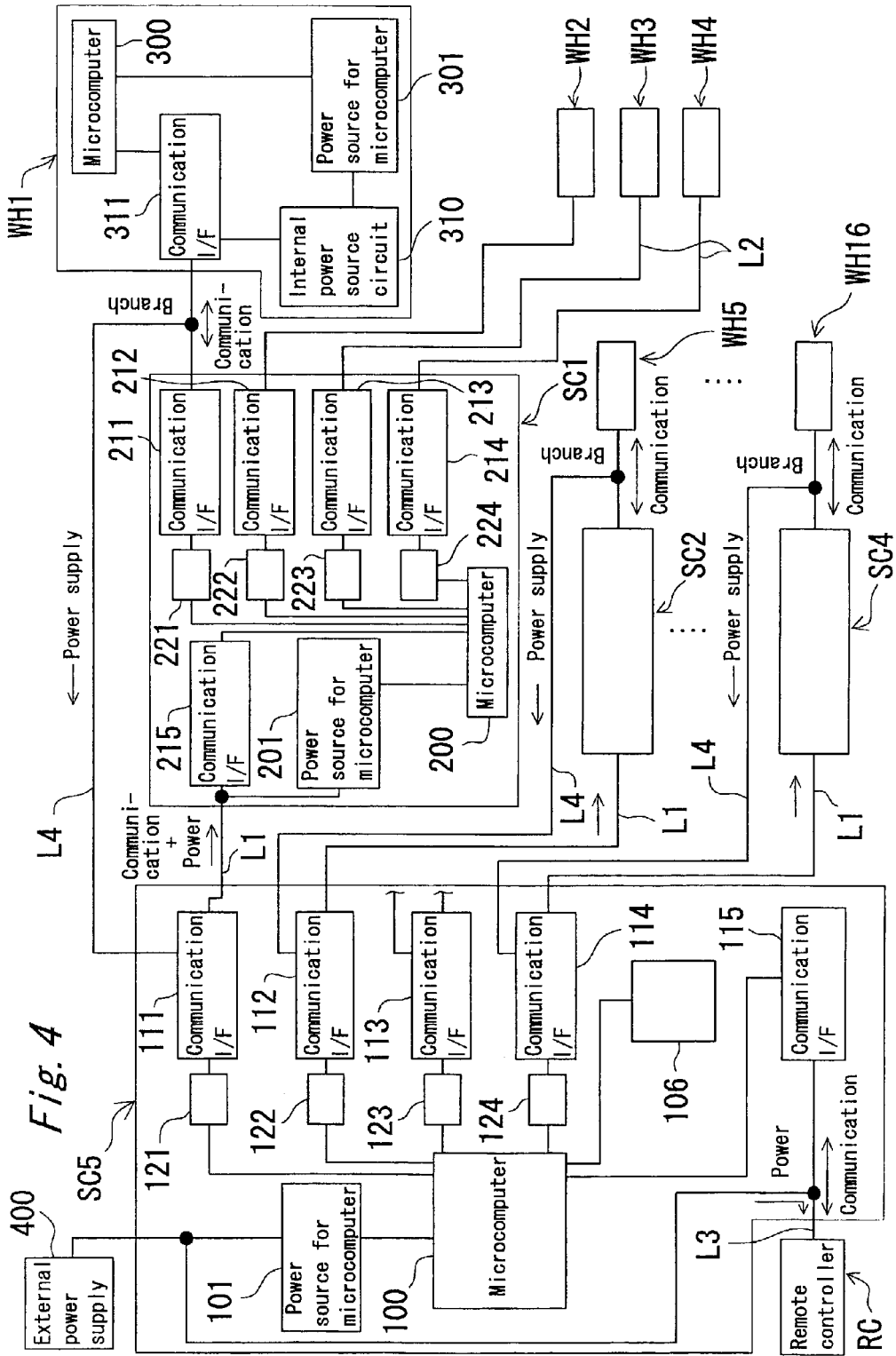
FIG. 4 is a block diagram schematically showing communication and power supply lines of the hot water supply system.

The control unit 7 is mainly composed of a microcomputer 300 (see FIG. 4).

This control unit 7 controls operation of parts of the water heater according to a control program of the microcomputer 300. Representative controls are explained, for example:

(1) Valve opening degree control of the flow rate control valve 6: This control consists of changeover of opening and closing of the flow rate control valve 6, and adjustment of opening degree of the valve. The former is a control for opening or closing the flow rate control valve 6 which is normally close, on the basis of the a control signal given from the sub-system controller. The latter is a control for regulating the tapping amount from the water heater WH by adjusting the valve opening degree of the opened flow rate control valve 6.

(2) Flame control of burner (not shown) for heating the heat exchanger: This control consists of a control of changing over ignition and extinction of the burner, and a control for adjusting the combustion amount of the burner. The former is a control for igniting the burner when the water passing amount in the distribution piping 4 exceeds a specified flow rate, and extinguishing when becoming lower than the specified flow rate, on the basis of a detection result of flow rate sensor (not shown) for detecting the passing water amount in the distribution piping 4. The latter is a control for adjusting the combustion amount of the burner so that the tapping temperature from the water heater WH may be a hot water set temperature described below, and this control is interlocked with the control by the main system controller SC5 described below.

(3) Control of trouble diagnosis and related matter of water heater: This control is principally for self-diagnosis of water heater on the basis of the sensing information of each sensor disposed in parts of the water heater, issuing data (error code) showing trouble to outside when fault is detected, and accumulating and recording the error code in a memory device (not shown) of the control unit 7 as fault history.

On the other hand, the system controllers SC1 to SC5 are classified by function into a main system controller SC5 and sub-system controllers SC1 to SC4, and they are disposed hierarchically as shown in FIG. 1.

The main system controller SC5 positioned at the highest hierarchy and a group of sub-system controllers SC1 to SC4 are connected so as to communicate with each other by means of communication line L1. The main system controller SC5 controls the sub-system controllers SC1 to SC4 through communications with the sub-system controllers SC1 to SC4, and acquires various information issued from the sub-system controllers SC1 to SC4.

On the other hand, the sub-system controllers SC1 to SC4 positioned at the lower hierarchy and a group of water heaters WH are connected so as to communicate with each other through communication line L2. The sub-system controllers SC1 to SC4 control the operation of water heaters through communications with the connected water heaters, and acquire various information issued from the water heaters. In particular, in the embodiment, the sub-system controllers SC1 to SC4 are designed to open, close and control the flow rate control valves 6 by way of the control units 7 of the water heaters, and the number of operating units of water heaters can be adjusted by opening or closing the flow rate control valves 6.

Thus, in the hot water supply system of the embodiment comprising the sub-system controllers SC1 to SC4 for centralizing controls of a group of water heaters WH and the higher main system controller SC5 for centralizing controls of this group of the sub-system controllers SC1 to SC4, by connecting them hierarchically, the operation of the individual water heaters WH1 to WH16 can be controlled through the sub-system controllers SC1 to SC4 at the lower hierarchy from the main system controller SC5 at the highest hierarchy, while the connection status and operation status of the individual water heaters WH1 to WH16 are monitored by the main system controller SC5.

The hierarchical relation of the system controllers shows the mutual connection relation of the system controllers, and the system controllers of an identical construction may be used regardless of the hierarchy. In this embodiment, however, in relation to the error display function and trouble recovery function, the highest main system controller SC5 is additionally provided with a nonvolatile memory device 106 such as flash memory or EEPROM, and a specified operation switch 107 (described later).

In FIG. 1, the system controllers are composed in two strata, but in the configuration having only one main system controller at the highest position, system controls for relaying may be provided in an intermediate stratum between the main system controller and sub-system controllers, and more than two strata may be composed.

In the illustrated example, each system controller is provided with four units each of lower devices (system controller or water heater), but it only shows that each system controller has four junctions (see FIG. 4) for connecting the lower devices, and the number of lower devices may be freely changed in a range of the number of junctions provided in each system controller.

A remote controller RC is an operation device for operating the hot water supply system by remote control by way of the main system controller SC5 located at the highest position of the hierarchy, and is connected to the main system controller SC5 so as to communicate with each other by way of communication line L3.

Figure 3:
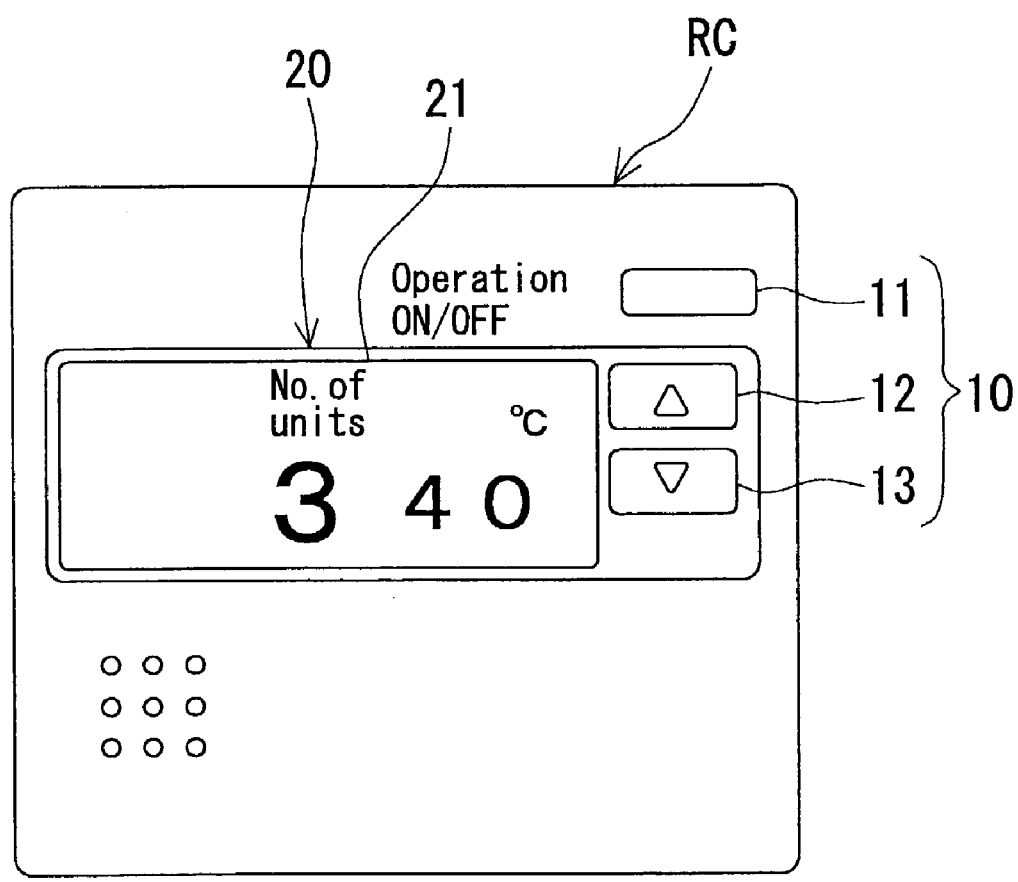
FIG. 3 is front view showing an appearance of a remote controller of the hot water supply system.

This remote controller RC comprises, as shown in FIG. 3, an operation unit (manipulation switch) 10 for on/off control of operation of the hot water supply system, setting of hot water supply temperature, and other operations, and a display unit 20 for displaying the setting and operation by the operation unit 10 and various information presented from the main system controller SC5.

The operation unit 10 of the remote controller RC includes an operation switch 11 for on/off control of operation, and an up switch 12 and a down switch 13 for setting or changing the hot water supply temperature. The display unit 20 includes a display panel 21 for displaying characters, symbols, and graphic patterns freely. Specifically, the display panel 21 is composed of liquid crystal panel, dot matrix fluorescent display tube, or other display device.

In this embodiment, the remote controller RC is designed to change over the operation modes by specific manipulation of the operation unit 10, for example, by simultaneous pressing of the up switch 12 and down switch 13. The operation mode is changed over by the software of the control unit (microcomputer not shown) of the remote controller RC. By changeover of the operation mode, the display content in the display unit 20 is changed, and the functions assigned to the up switch 12 and down switch 13 are changed over (detail is described later).

FIG. 4 is a block diagram showing a schematic configuration of communication line and power supply line of the hot water supply system shown in FIG. 1.

The main system controller SC5 principally comprises a microcomputer 100 as the control center of the main system controller SC5, communication interfaces (device junctions) 111 to 114 for communication with the sub-system controller SC1 to SC4, and a communication interface 115 for communication with the remote controller RC.

The microcomputer 100 is designed to receive power supply from a microcomputer power source (direct-current 5 V) 101 incorporated in the main system controller SC5, and this microcomputer power source 101 is further designed to receive power supply from an external power source 400. The external power source 400 is composed of, for example, a switching power source circuit for generating a power source of direct-current 15V from a commercial power source, and supplies power source to the parts (not shown) of the main system controller SC5 and also the microcomputer power source 101, and further supplies power source (direct-current 15 V) to the remote controller RC by way of the communication line L3.

Photo couplers 121 to 124 are interposed between the microcomputer 100 and the communication interfaces 111 to 114, and by these photo couplers 121 to 124, the microcomputer 100 and communication interfaces 111 to 114 are insulated, and the communication interfaces 111 to 114 are also insulated from each other.

The sub-system controllers SC1 to SC4 have a circuit construction nearly similar to that of the main system controller SC5. The circuit construction of the sub-system controllers SC1 to SC4 is explained below by referring to an example of the sub-system controller SC1.

The sub-system controller SC1 mainly comprises a microcomputer 200 as a control center, communication interfaces (device junctions) 211 to 214 for communication with the water heaters WH1 to WH4, and a communication interface 215 for communication with the main system controller SC5.

The microcomputer 200 of the sub-controller SC1 is designed to receive power supply from a microcomputer power source (direct-current 5 V) 201 incorporated in the sub-system controller SC1. Herein, the microcomputer power source 201 is further designed to receive power supply from any one (the water heater WH1 in the illustrated example) of the water heaters WH1 to WH4 connected to this sub-system controller SC1.

In this embodiment, the direct-current power source (15 V) issued from a power source circuit 310 incorporated in the water heater WH1 is fed into the communication interface 111 of the main system controller SC5 by way of power supply line L4, and is superposed and transmitted to the microcomputer power source 201 together with a control signal through communication line L1 from the communication interface 111. The driving power source of the parts of the sub-system controller SC1 is also supplied from the water heater WH1 by way of the communication interface 111 (not shown).

Same as in the main system controller SC5, photo couplers 221 to 224 are interposed between the microcomputer 200 of the sub-system controller SC1 and the communication interfaces 211 to 214, and thereby, the microcomputer 200 and communication interfaces 211 to 214 are insulated, and the communication interfaces 211 to 214 are also insulated from each other.

The water heaters WH1 to WH16 are explained below by referring to an example of the water heater WH1. The water heater WH1 mainly comprises a microcomputer 300 as a control center, and a communication interface 311 for communication with the sub-system controller SC1.

The microcomputer 300 is designed to receive power supply from a microcomputer power source (direct-current 5 V) 301 incorporated in the water heater WH1, and this microcomputer power source 301 is further designed to receive power supply from an internal power source circuit 310. The internal power source circuit 310 is composed of a switching power source circuit for generating a power source of direct-current 15 V from a commercial power source not shown.

This internal power source circuit 310 is preferred to receive power source from a different power line from the external power supply 400, and in this embodiment, the power is supplied from other line.

As described herein, in the hot water supply system of the embodiment, the system controllers SC1 to SC4 receive driving power source individually from any one of the water heaters connected thereto, while the main system controller SC5 receives driving power source from the external power supply 400 of a different line from these sub-system controllers SC1 to SC4, and therefore if any power failure occurs in any system controller, the other system controllers can operate normally.

The action of the hot water supply system having such configuration is explained. In the hot water supply system of the embodiment, while the system is in action, the microcomputers 100, 200, 300 installed in the system controllers SC1 to SC5 and water heaters WH1 to WH16 operate as follows accordion to the control program and control data stored in the microcomputers 100, 200, 300.

A. Operation Control by Main System Controller

In the hot water supply system of the invention, as mentioned above, the plural system controllers SC1 to SC5 are disposed hierarchically, and the operation of the individual water heaters WH1 to WH16 can be controlled from the main system controller SC5 at the highest hierarchy.

The detail of operation control of water heaters by the main system controller SC5 is explained by reference to FIG. 5 to FIG. 8.

(1) Increasing Control of the Number of Operating Units

The operation control by the main system controller SC5 is valid when the on/off switch 11 of the remote controller RC is in ON mode.

When the system operation is in ON mode, the main system controller SC5 sends an operation start command to a lower sub-system controller according to the setting (specifically, the setting of the number of operating units of water heaters WH to be operated upon start of tapping) of the microcomputer 100.

In the illustrated example, the number of water heaters to be operated upon start of tapping is set at one unit. Therefore, in this example, the operation start command is sent to any one (specifically SC1) of the sub-system controllers SC1 to SC4 (S1 in FIG. 5).

When the number of water heaters to be operated upon start of tapping is set at two units, the operation start command is sent to any two of the sub-system controllers SC1 to SC4. That is, when a large volume is needed from the beginning of tapping, the number of water heaters to be operated upon start of tapping may be preset at two or more units, and plural water heaters can be operated from the beginning of tapping.

By receiving an operation start command, the sub-system controller SC1 is set in running status. The sub-system controller SC1 in running status sends a command to open the flow rate control valve 6 to the control unit 7 of anyone (WH1 in the illustrated example) of the water heaters WH1 to WH4 connected according to the setting, puts this water heater WH1 in waiting state. At this time, in the remaining water heaters WH2 to WH4, the flow rate control valves 6 are closed.

Figure 5:
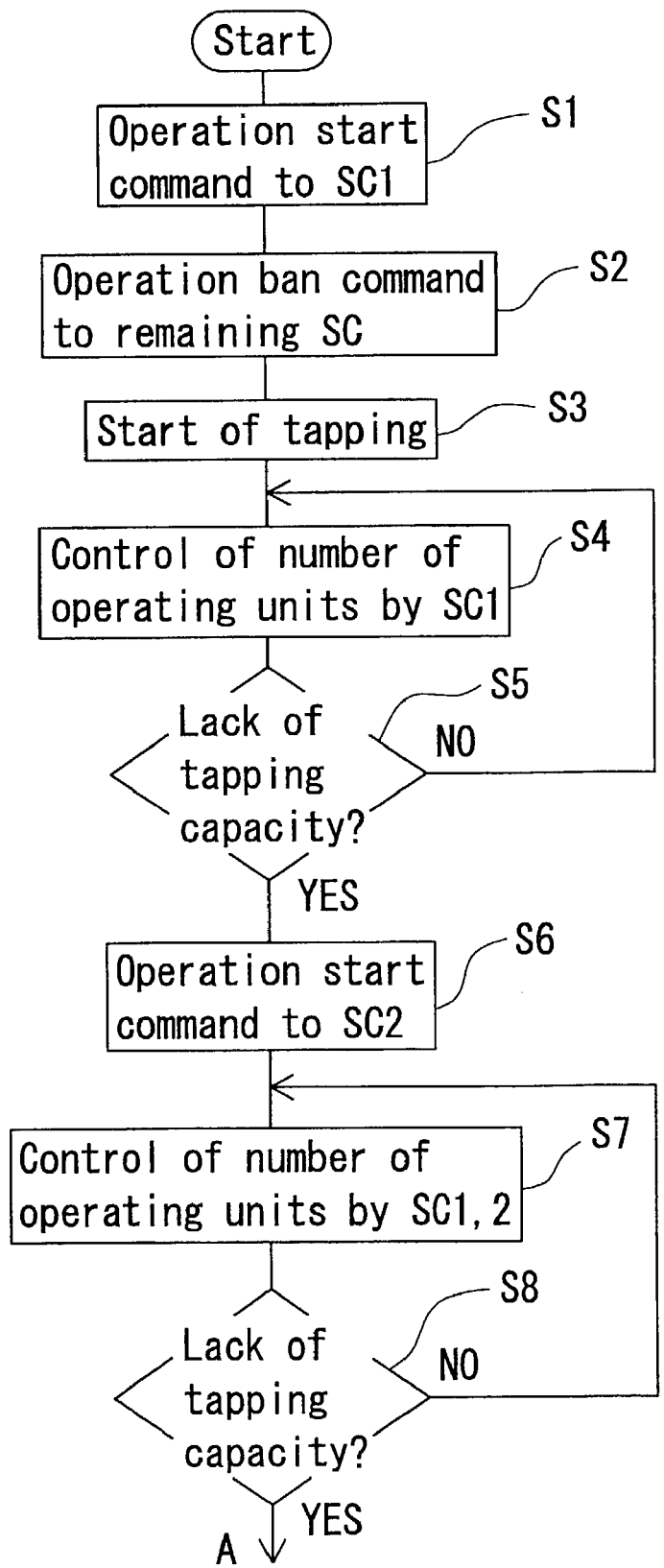
FIG. 5 is a flowchart showing control procedure of the hot water supply system.

On the other hand, the main system controller SC5 sends an operation ban command to prohibit operation to the remaining sub-system controllers SC2 to SC4 other than the sub-system controller SC1 issuing the operation start command (S2 in FIG. 5). As a result, these sub-system controllers SC2 to SC4 are put in stopped status, and the flow rate control valves 6 of the water heaters WH5 to WH16 connected to those sub-system controllers SC2 to SC4 are kept in closed status.

In this state, when the faucet 2 is opened and tapping is started from the faucet 2 (S3 in FIG. 5), the water heater WH1 in waiting status passes water and the water heater WH1 starts its operation. Consequently, control of the number of operating units of water heaters is started only by the sub-system controller SC1 (S4 in FIG. 5).

This control of the number of operating units is to increase the number of operating units of the water heaters gradually depending on the shortage of the tapping capacity as the tapping capacity by one water heater is insufficient and cannot meet the tapping need due to increase of tapping water (increase of tapping demand) from the faucet 2, and to decrease the number of operating units of the water heaters gradually as the number of operating units of water heaters is too many (the tapping capacity is excessive) as a result of decrease of tapping amount (decrease of tapping demand).

As the tapping demand increases, when the tapping demand cannot be satisfied by the control of the number of operating units by the sub-system controller SC1 alone, in the other words, when the tapping capacity is insufficient by operating all water heaters WH1 to WH4 (Yes at S5 in FIG. 5), lack of capacity is noticed from the sub-system controller SC1 to the main system controller SC5. The main system controller SC5, detecting such status by communication, issues an operation start command to a next sub-system controller (SC2 in the illustrated example) (S6 in FIG. 5).

As a result, the operation ban status of the sub-system controller SC2 is cleared, and the number of operating units of the water heaters WH1 to WH8 is controlled by the sub-system controllers SC1 and SC2 (S7 in FIG. 5).

Figure 6:
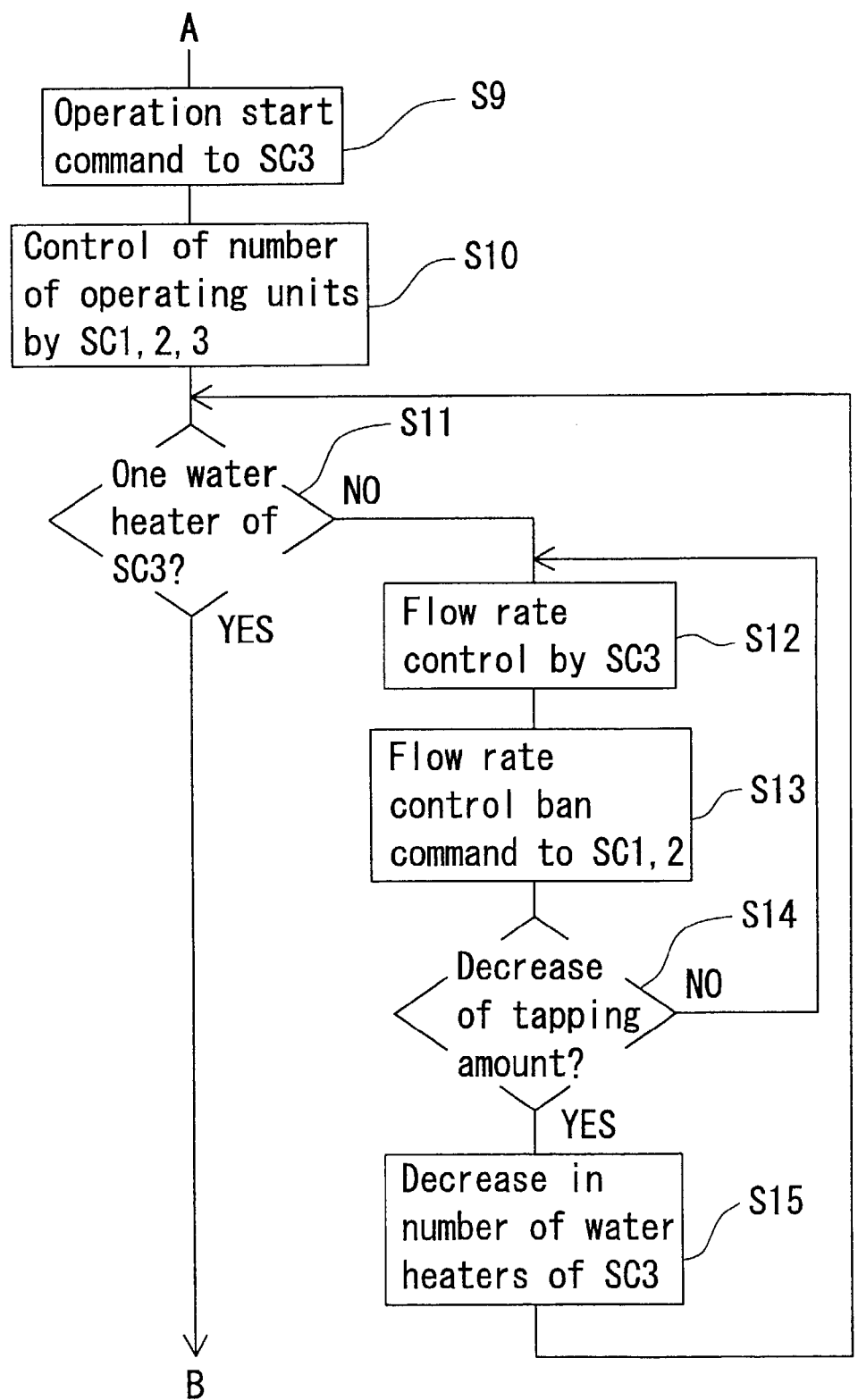
FIG. 6 is a flowchart following A in FIG. 5 of the hot water supply system.

As the tapping demand further increases, when the tapping capacity is insufficient by the control of the number of operating units by the sub-system controllers SC1 and SC2 (Yes at S8 in FIG. 5), the main system controller SC5 issues an operation start command to a next sub-system controller (SC3 in the illustrated example) (S9 in FIG. 6), and the number of operating units of the water heaters WH1 to WH12 is controlled by the three sub-system controllers SC1 to SC3 (S10 in FIG. 6).

Although not shown, as the tapping demand increases more, in the same procedure, the main system controller SC5 issues an operation start command to the sub-system controller SC4, and the number of operating units of the water heaters WH1 to WH16 is controlled by the sub-system controllers SC1 to SC4.

Thus, in the embodiment, the main system controller SC5 issues operation start commands sequentially to the sub-system controllers SC1 to SC4 to increase the number of operating units of the water heaters, so that a sufficient tapping is guaranteed in the case of a demand for a huge tapping capacity.

(2) Decreasing Control of the Number of Operating Units

Figure 7:
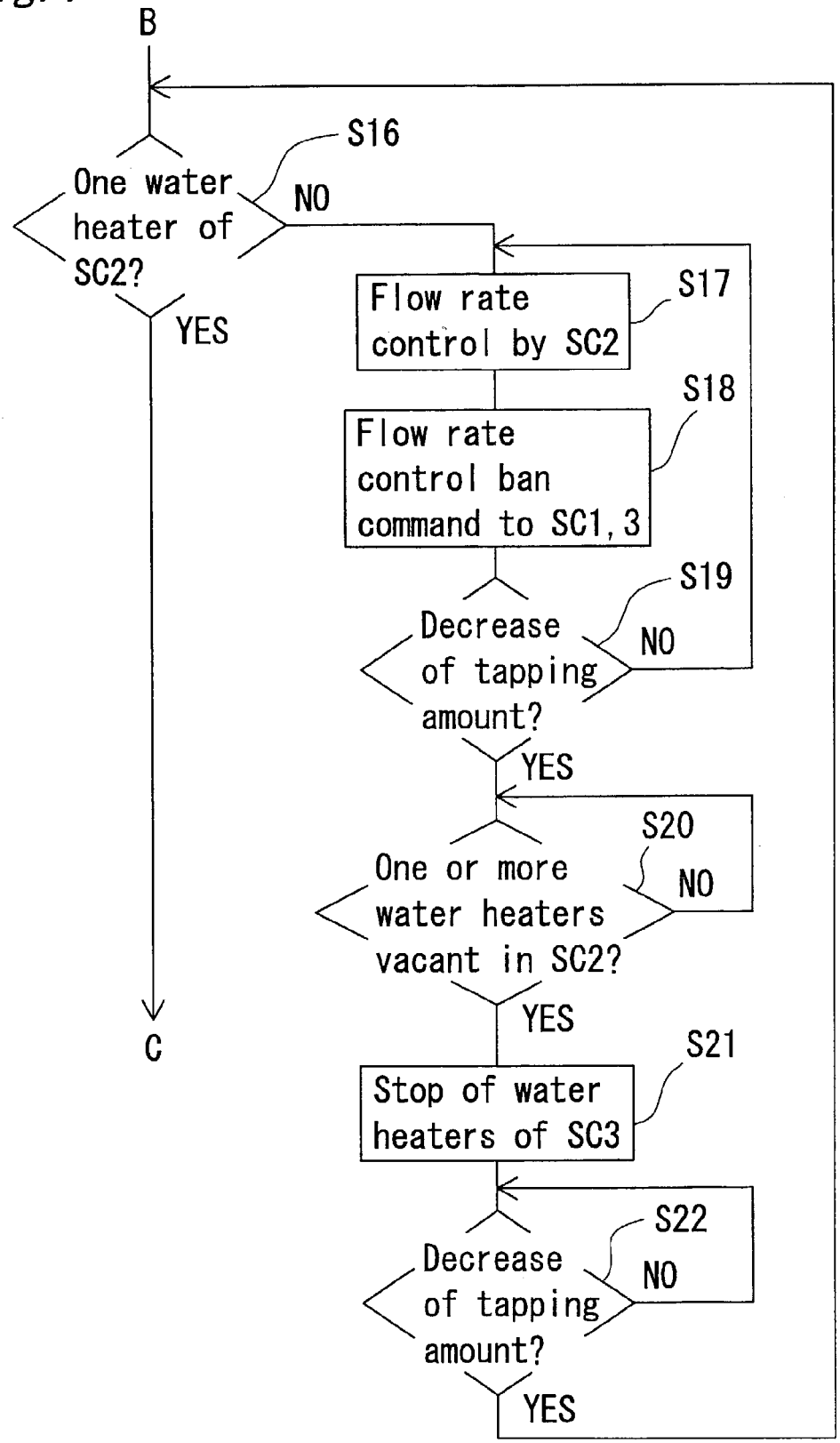
FIG. 7 is a flowchart following B in FIG. 6 of the hot water supply system.

The procedure in the case of decrease of the tapping amount (decrease of tapping demand) from the faucet 2 is explained by referring to FIG. 6 and FIG. 7.

As the tapping demand decreases, the main system controller SC5 prohibit the flow rate control of the water heaters (WH1 to WH8 in this case) under the control of other sub-system controllers (SC1 and SC2 in this example) depending on the number of operating units of the water heaters WH9 to WH12 under the control of the final sub-system controller (SC3 in FIG. 6) assigned with the operation start command.

Herein, the flow rate control refers to an adjustment of combustion amount of the burner by the control unit 7 of the water heater depending on the increase or decrease of tapping amount so that the tapping temperature from the faucet 2 may remain at a specified temperature.

More specifically, when the number of water heaters under the control of the sub-system controller SC3 is two or more (No at step S11), the main system controller SC5 allows the sub-system controller SC3 to continue to control the flow rate (S12 in FIG. 6), and issues a flow rate control ban command to prohibit adjustment of the flow rate to other sub-system controllers SC1 and SC2 (S13 in FIG. 6). This flow rate control ban command is sent through other sub-system controllers SC1 and SC2 also to the control units 7 of the water heaters WH1 to WH8 under the control thereof. As a result, at the beginning of decrease of tapping amount, the flow rate is not adjusted in the water heaters WH1 and WH8 under the control of the sub-system controllers SC1 and SC2, and the full combustion capacity of the burners is maintained.

As the tapping amount further decreases (Yes at S14 in FIG. 6), the combustion amount of the water heaters in the sub-system controller SC3 is gradually reduced, and the number of operating units of water heaters is decreased depending on the degree of decrease of the tapping amount (S15 in FIG. 6).

When the number of operating units of water heaters in the sub-system controller SC3 is decreased to one unit (Yes at S11 in FIG. 6), the main system controller SC5, while maintaining the active state of the sub-system controller SC3, makes a same judgement as at step S11 in the sub-system controller (SC2 in the illustrated example) receiving the operation start command before the sub-system controller SC3 (S16 in FIG. 7).

At this point, all of the water heaters WH5 to WH8 under the control of the sub-system controller SC2 are in full combustion, and it is judged negatively at step S16. As a result, the main system controller SC5 issues a flow rate control start command to start adjustment of flow rate to the sub-system controller SC2 (S17 in FIG. 7), and sends a flow rate control ban command to prohibit adjustment of flow rate to the other sub-system controllers (SC1 and SC3 in this case) (S18 in FIG. 7).

Therefore, the flow rate control is started in the water heaters WH5 to WH8 under the control of the sub-system controller SC2, and full combustion continues in the water heaters (WH1 to WH4, WH9) under the control of the sub-system controllers SC1 and SC3.

In the embodiment, in this manner, when the tapping demand decreases, the main system controller SC5, depending on the number of operating units of water heaters under the control of the final sub-system controller assigned with operation start command, allows the corresponding sub-system controllers to adjust the flow rate when the number of operating units is too many (two units or more), and allows the other system controllers to adjust the flow rate when the number of operating unit is small (that is, one unit), so that it is flexible to cope also with decrease in the tapping demand.

(3) Operation Stop Command of Water Heaters

Figure 8:
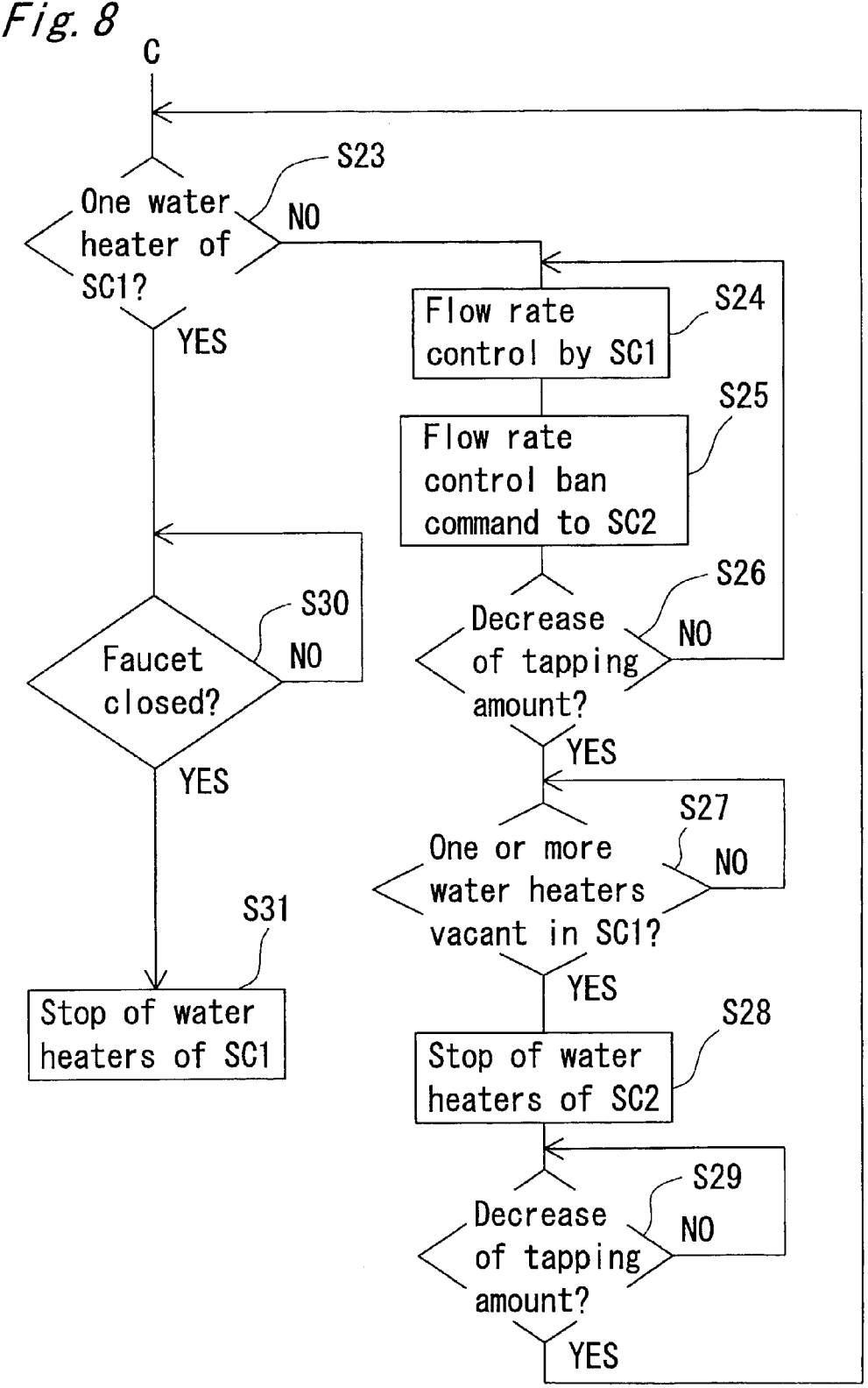
FIG. 8 is a flowchart following C in FIG. 7 of the hot water supply system.

Operation stop of water heaters is explained by referring to FIG. 7 and FIG. 8. Operation stop of water heaters means to stop tapping by stopping combustion in the water heaters.

Suppose the hot water supply system is in the state of step S17, S18 in FIG. 7, when the tapping demand decreases (Yes at S19 in FIG. 7), since the flow rate control is banned in the sub-system controllers SC1 and SC3, the tapping amount of the water heaters WH5 to WH8 under the control of the sub-system controller SC2 is controlled depending on the degree of decrease of tapping amount, and the number of operating units of the water heaters WH5 to WH8 is decreased.

As a result of this decrease, when vacancy (operation stop) occurs in one or more water heaters under the control of the sub-system controller SC2, the main system controller SC5 issues an operation stop command to the sub-system controller SC3, and the operation of the water heater WH9 in operation is stopped (S21 in FIG. 7).

That is, in this embodiment, the timing for stopping the operation of the water heaters centralized by one sub-system controller is determined depending on the number of operating units of water heaters centralized by other sub-system controllers. In other words, when the command right for adjusting the flow rate is transferred to other sub-system controller (for example, SC2) than the sub-system controller starting operating in the last place (for example, SC3), operation of the water heater of the sub-system controller (SC3) before transfer is stopped depending on the state of the number of decrease of the number of operating units of the water heaters (WH5 to WH8) centralized by the system controller (SC2) after transfer. As a result, it is effective to prevent operating water heaters from being left over in the group of water heaters unable to adjust the flow rate (herein WH9 to WH12).

By a further decrease demand (Yes at S22 in FIG. 7), when the number of operating units of water heaters under the control of the sub-system controller SC2 is decreased to one unit (Yes at S16 in FIG. 7), same as explained above, the command right for adjusting the flow rate is transferred to the sub-system controller SC1, and the flow rate is adjusted by the water heaters under the control of the sub-system controller SC1 (S23, S24 in FIG. 8). At this time, a flow rate control ban command is issued from the main system controller SC5 to the sub-system controller SC2 (S25 in FIG. 8).

In this state, when the tapping demand further decreases (Yes at S26 in FIG. 8), depending on the degree, the water heaters under the control of the sub-system controller SC1 are reduced in the tapping amount and extinguished gradually. When vacancy of one unit or more occurs in the number of operating units of the water heaters under the control of the sub-system controller SC1 (Yes at S27 in FIG. 8), an operation ban command is issued to the currently active sub-system controller SC2, and the operation of the water heater WH5 is stopped (S28 in FIG. 8).

As a result, for further decrease demand of tapping, the flow rate is adjusted and the number of operating units is controlled only by the water heaters WH1 to WH4 under the control of the sub-system controller SC1.

When the number of operating units of water heaters controlled by the sub-system controller SC1 is decreased to one unit (Yes at S23 in FIG. 8), the flow rate is adjusted by this final water heater, and when the faucet 2 is closed in this state (Yes at S30 in FIG. 8), water passing of the water heater WH1 stops, and the operation of the water heater WH1 is stopped (S31 in FIG. 8)

B. Various Display Functions in Remote Controller

Various display functions in the remote controller RC are explained below. The following display functions are realized by mutual data communications between system controllers making use of the hierarchical structure of the system controllers SC1 to SC5. These display functions can be selected by changing over the operation modes of the remote controller RC.

(1) Tapping Capacity Display Function

This function is to display the total tapping capacity of the water heaters WH1 to WH16 connected to the hot water supply system.

To display the tapping capacity, first of all, the main system controller SC5 at the highest hierarchy issues a transmission request of data relating to the tapping capacity to all water heaters WH1 to WH16 connected to the system. This transmission request is sent to the individual water heaters WH1 to WH16 by way of the lower system controllers SC1 to SC4.

The control units 7 of the water heaters WH1 to WH16 receiving this transmission request transmit the data of tapping capacity to the higher sub-system controllers SC1 to SC4. The tapping capacity data is composed of the numerical data of the combustion amount of burners of water heaters WH1 to WH16, and generated in the control unit 7 of each water heater.

In the sub-system controllers SC1 to SC4, the tapping capacity data transmitted from the water heaters are accumulated. Specifically, the system controller SC1 determines the cumulative value of tapping capacity data sent from the water heaters WH1 to WH4. Similarly, the system controller SC2 determines the cumulative value of the water heaters WH5 to WH8, the system controller SC3 determines the cumulative value of the water heaters WH9 to WH12, and the system controller SC4 determines the cumulative value of the water heaters WH13 to WH16.

Thus, in the sub-system controllers SC1 to SC4, when the cumulative value of tapping capacity of four water heaters is determined individually, these cumulative values are sent to the highest main system controller SC5. The main system controller SC5 sums up the values transmitted from the lower sub-system controllers SC1 to SC4, and calculates the total tapping capacity of the entire hot water supply system.

When the tapping capacity of the entire system is calculated, the result of calculation is transmitted to the remote controller RC, and is displayed in specified unit in a display unit 20 of the remote controller RC. FIG. 9(a) shows a display example, in which the unit of tapping capacity is the operation units.

During this display, when the tapping capacity value is changed due to some factors such as change of combustion amount of burner in any water heater, the changed tapping capacity data is accumulated in the same procedure, and the changed cumulative result is shown in the display unit 20.

Thus, in the hot water supply system of the embodiment, since the total tapping capacity of the water heaters WH1 to WH16 connected to the system is shown in the display unit 20 of the remote controller RC, the tapping capacity of the entire hot water supply system can be always monitored.

(2) Display Function of Number of Operating Units of Water Heaters

In the hot water supply system of the invention, the display function of the number of operating units of water heaters WH is explained.

This function is to display the number of operating units of the water heaters WH1 to WH16 connected to the hot water supply system, that is, the number of water heaters engaged in combustion operation.

As described above, the number of operating units of the water heaters WH1 to WH16 is controlled by the sub-system controllers SC1 to SC4. That is, during operation of the system, the sub-system controllers SC1 to SC4 are monitoring the number of operating units of water heaters under the control, and transmit the monitored data of the number of operating units of water heaters to the higher main system controller SC5.

The main system controller SC5 accumulates the data of number of operating units of water heaters transmitted from the individual sub-system controllers SC1 to SC4, and calculate the total number of water heaters currently in operation. The result of calculation is transmitted to the remote controller RC, and is displayed in the display unit 20 of the remote controller RC. FIG. 9(b) shows an example of this display, in which ten units are in operation.

Thus, in this hot water supply system of the embodiment, since the number of water heaters in combustion operation is displayed in the display unit 20 of the remote controller RC, the number of operating units of water heaters can be easily known by observing the display of the display unit 20.

(3) Display Function of Number of Connected Units of Water Heaters

In the hot water supply system of the invention, the display function of the number of connected units of water heaters is explained.

This function is to display the number of connected units of the water heaters WH1 to WH16 connected to the hot water supply system, that is, the number of water heaters connected to the sub-system controllers SC1 to SC4.

That is, the sub-system controllers SC1 to SC4 detect the number of connected water heaters WH (number of connected units), and transmit the data of the number of connected units to the higher main system controller SC5. The number of connected units is detected on the basis of results of communications conducted all the time or periodically between the sub-system controller SC and water heaters WH in relation to the error display function described later.

The higher system controller SC5 accumulates the data of number of connected units of water heaters transmitted from the lower sub-system controllers SC1 to SC4, and calculate the total number of water heaters connected to the entire system. The calculated number of connected units of water heaters is transmitted to the remote controller RC and displayed in its display unit 20 (not shown) same as in the case of display of the number of operating units.

During this display of number of connected units, if there is change in the number of connected units of water heaters in any of the lower sub-system controllers SC1 to SC4, such information is transmitted from the sub-system controller to the main system controller, and the changed number of connected units is displayed in the display unit 20.

Thus, in this embodiment, since the number of water heaters connected to the system is displayed in the display unit 20 of the remote controller RC, the number of connected units of water heaters WH can be easily known by observing the display of the display unit 20.

(4) Error Display Function (Trouble of Water Heater)

An example of error display function in the hot water supply system of the invention is described.

This function is to display an error code transmitted from the water heater and the information identifying the water heater having transmitted such error code, in case a trouble occurs in any water heater of the water heaters WH1 to WH16 (including, aside from the trouble of the water heater itself, abnormal operation of water heater due to stop of water supply or fuel gas supply).

Supposing a trouble has occurred in the water heater WH2, the control unit 7 of the water heater WH2 transmits an error code corresponding to the type of trouble to the sub-system controller SC1. Transmission process of error code is executed by the control unit 7 of the water heater. The transmitted error code is stored and held as trouble history in the memory device (not shown) of the control unit 7.

When receiving the error code from the water heater, the sub-system controller SC1 adds the data identifying the defective water heater WH2 (device identification information) to the error code, and transmits to the main system controller SC5 together.

As the device identification information, for example, specific codes (such as running numbers in the entire sub-system controllers SC1 to SC4) may be preliminarily assigned at the junctions with the water heaters (communication interfaces 211 to 214) in the sub-system controller SC1, and these specific codes may be used as the device identification information.

Receiving the error code and device identification information, the main system controller SC5 transmits them to the remote controller RC.

The remote controller RC, on the basis of the information transmitted from the main system controller SC5, displays the information identifying the defective water heater WH2 (WH02 in the illustrated example) and error code showing the type of trouble (311 in the illustrated example) in the display unit 20 as shown in FIG. 9(c).

Therefore, according to the hot water supply system of the embodiment, if a trouble occurs in any one of the water heaters WH1 to WH16, the service man can instantly know the defective water heater and its status by viewing the display unit 20 of the remote controller RC, so that the time and labor spent for maintenance of the hot water supply system can be saved substantially.

(5) Error Display Function (Communication Trouble)

Other example of error display function in the hot water supply system of the invention is described.

This function is to display occurrence of trouble in case a communication trouble occurs due to trouble of the water heater or sub-system controller itself or breakage of communication wire or the like.

A first explanation relates to a communication trouble due to trouble of any one of the water heaters WH1 to WH16 or breakage of communication line L2.

Concerning this function, when the operation of the hot water supply system starts, the sub-system controllers SC1 to SC4 communicate with the connected water heaters WH, and check connection status of water heaters depending on presence or absence of response from the water heaters WH.

The sub-system controllers SC1 to SC4, as a result of checking the connection status, transmits the number of connected units of responding water heaters to the main system controller SC5 as the number of presently connected units (x). This connection status is monitored all the time or periodically during operation of the system, and the result is transmitted on every occasion to the main system controller SC5 as the number of presently connected units (x).

On the other hand, the main system controller SC5 stores the number of presently connected units (x) transmitted from the sub-system controllers SC1 to SC4 in specified regions of the memory device 106 in individual sub-system controllers. At this time, the main system controller SC5 compares the latest information (x) of the number of presently connected units transmitted from the sub-system controllers SC1 to SC4 with the number of presently connected units (x') stored in the memory device 106, and stores the greater number as the maximum number of connected units (y) in a different storage region in the memory device 106 (a different storage region from the storage region of the number of presently connected units x).

Thus, the number of presently connected units (x) and maximum number of connected units (y) stored in the memory device 106 are read out from the memory device 106 by specified operation of the remote controller RC, and displayed in the display unit 20.

An example of display format is shown in FIG. 9(d). In the illustrated example, the number of presently connected units (x) and maximum number of connected units (y) of the sub-system controller SC1 are displayed simultaneously, and in this case the maximum number of connected units is four and the number of presently connected units is three, and it is known from this display that communication trouble has occurred in any one of the water heaters WH1 to WH4 connected to the sub-system controller SC1.

A next explanation relates to a communication trouble due to trouble of any one of the sub-system controllers SC1 to SC4 or breakage of communication line L1.

In the event of such communication trouble, communication fails between the defective sub-system controller (for example, SC2) and the main system controller SC5, and transmission of data about the number of presently connected units (x) is cut off.

In this state, when display of the sub-system controller SC2 is selected by the specified operation, the main system controller SC5 informs the remote controller RC of communication trouble of the sub-system controller SC2, so that a specified error display is made on the display unit 20. FIG. 9(e) shows an example of such error display, in which the maximum number of connected units (y) and number of presently connected units (x) are not displayed, and only an error code (z) ( - - - in the illustrated example) showing communication trouble of system controller is shown.

By viewing this error display, the service man easily recognizes which one of the sub-system controllers SC1 to SC4 has communication trouble, so that the time and labor for maintenance can be saved.

In this embodiment, communication trouble is displayed by specified operation of the remote controller RC, but by setting the software of the main system controller SC5, it may be displayed by force when communication trouble is detected.

C. Emergency Operation Function

The emergency operation function in the hot water supply system of the invention is described. The hot water supply system of the invention is designed to operate safely as specified in case of trouble occurring in part of the system according to the setting of the control programs in the main system controller SC5, sub-system controllers SC1 to SC4, and microcomputers 100, 200, 300, etc. installed in the water heaters WH1 to WH16, and also to execute an emergency operation in other normal parts of the system.

Modes of such emergency operation are explained below by dividing into locations of occurrence of trouble.

(1) Trouble of Remote Controller RC, Breakage of Communication Line L3, etc.:

If remote control by the remote controller RC fails due to trouble of remote controller RC or breakage of communication line L3, the following safe action and emergency operation are executed.

[Safe Action]

Such occurrence is detected by the microcomputer 100 of the main system controller SC5. More specifically, the microcomputer 100 detects the occurrence of such event by receiving the error code transmitted from the remote controller RC or monitoring the communication status with the remote controller RC.

When such status is detected, the main system controller SC5 transmits an operation stop command to stop combustion and stop tapping to the individual water heaters WH1 to WH16 by way of the sub-system controllers SC1 to SC4.

As a result, in the individual water heaters WH1 to WH16, the burner combustion stop process and full closure process of flow rate control valve 6 are executed, and tapping from the water heaters WH1 to WH16 is stopped.

[Emergency Operation]

On the other hand, the user of the hot water supply system knows some trouble has occurred in the hot water supply system because tapping from the water heaters WH1 to WH16 is stopped and the operation of the water heaters WH is not resumed if the remote controller RC is manipulated.

In this embodiment, the following emergency operation is started in this stage in the condition that the power source of the main system controller SC5 is reset (turned on again) At this moment, however, the remote controller RC remains invalid, and the power source of the main system controller SC5 is reset by manipulating the power switch (not shown) of the main system controller SC5.

When the power source of the main system controller SC5 is reset, the main system controller SC5 checks again for presence or absence of communication trouble in the same procedure as mentioned above.

At this time, if already recovered from the trouble of remote controller RC or breakage of communication line L3, the main system controller SC5 returns to normal control.

If not recovered yet from the trouble of remote controller RC or the like, the main system controller SC5 judges that the remote controller RC is not connected, and fixes the hot water supply temperature at the predetermined temperature, and executes the control of the number of operating units. That is, if the operation from the remote controller RC is invalid, a command is issued to each water heater WH to operate at specified hot water supply temperature, so that excessively hot water may not come out from the faucet 2.

When the faucet 2 is opened in this state, therefore, the water heaters WH1 to WH16 tap out hot water at specified hot water supply temperature. This hot water supply temperature is maintained until the remote controller RC resumes normal control operation and the hot water supply temperature is normally corrected by the remote controller RC.

(2) Trouble of Sub-system Controller SC1 to SC4 or Breakage of Communication Line L1

Due to trouble in any one of the sub-system controllers SC1 to SC4 or breakage of communication line L1, if the sub-system controller SC1 to SC4 cannot be controlled by the main system controller SC5 (supposing SC1 cannot be controlled), such abnormality is detected by the microcomputer 100 of the main system controller SC5. This is detected by receiving the error code transmitted from the sub-system controller SC1 or monitoring the communication status of the communication line L1

When such control disabled status is detected by the main system controller SC5, the main system controller SC5 excludes this disabled sub-system controller SC1, and starts emergency operation of the system.

In this case, the main system controller SC5 operates and controls as stated above by using the sub-system controllers SC2 to SC4, and starts tapping by using the water heaters WH5 to WH16. During execution of this emergency operation, the main system controller SC5 causes the remote controller RC to display the status of emergency operation excluding the sub-system controller SC1 in its display unit 20 (not shown).

On the other hand, in the sub-system controller SC1 excluded from the emergency operation, the following process is executed depending on the nature of trouble, that is, whether the trouble of the sub-system controller SC1 itself or breakage of communication line L1.

First, in case of trouble of the sub-system controller SC1 itself, according to the error code issued from the microcomputer 200 of the sub-system controller SC1, the control unit 7 of each one of the water heaters WH1 to WH4 detects trouble of the sub-system controller SC1. This is detected independently in the water heaters WH1 to WH4. In the water heaters WH1 to WH4 detecting such trouble, the control unit 7 stops combustion of burner, and closes the flow rate control valve 6 to stop tapping. Thus, tapping is stopped in all water heaters WH1 to WH4 connected to the sub-system controller SC1.

As a result, the tapping operation by the sub-system controllers SC2 to SC4 is stabilized at the tapping temperature determined by the remote controller RC.

This process of stopping combustion and stopping tapping in the water heaters WH is executed as emergency process at the water heater side even in case of communication failure between the water heaters and sub-system controllers, for example, due to breakage of communication line L2.

On the other hand, in the case of breakage of communication line L1, the sub-system controller SC1 is normally operating, and the breakage of communication line L1 is detected by the sub-system controller SC1. This is detected by monitoring communication by the microcomputer 200. When breakage of communication line L1 is detected, the sub-system controller SC1 transmits an operation stop command to the connected water heaters WH1 to WH4. Consequently, the combustion operation of the water heaters WH1 to WH4 connected to this sub-system controller SC1 is stopped, and the flow rate control valve 6 is closed to stop tapping.

Therefore, also in this case, the tapping operation by the sub-system controllers SC2 to SC4 is stabilized at the tapping temperature determined by the remote controller RC.

Thus, in the event of trouble of sub-system controller SC1 to SC4 or breakage of communication line L1, the main system controller SC5 excludes the defective sub-system controller and continues to manage the system, while water heaters are stopped and tapping is suspended by the judgement of the defective sub-system controller or the water heaters under the control thereof, so that the main system controller SC5 continues the hot water supply operation by using the normally functioning sub-system controllers.

(3) Trouble of Main System Controller SC5 or Breakage of Communication Line L1

In the event of trouble of main system controller SC5 or breakage of communication line L1, such trouble or breakage is detected by the microcomputer 200 of the sub-system controllers SC1 to SC4. This is detected by the error code transmitted from the main system controller SC5 or communication monitoring.

In the sub-system controllers SC1 to SC4, when trouble of the main system controller SC5 is detected, the sub-system controllers SC1 to SC4 transmit operation stop commands to the water heaters WH1 to WH16, and stop combustion operation and tapping of the water heaters WH1 to WH16 (see the safe action mentioned above).

On the other hand, the user of the hot water supply system knows some trouble has occurred in the hot water supply system at this moment because the operation of the water heaters WH1 to WH16 is stopped and the operation of the water heaters WH is not resumed if the remote controller RC is manipulated.

In this embodiment, the following emergency operation is started in this stage in the condition that the power source of the sub-system controllers SC1 to SC4 is reset. In this state, the power source is reset by manipulating directly the sub-system controllers SC1 to SC4.

When the power source of the sub-system controllers SC1 to SC4 is reset (turned on again), the microcomputer 200 of the sub-system controllers SC1 to SC4 detects again trouble or communication failure of the main system controller SC5. If the main system controller SC5 is still in a status of trouble or communication failure, the sub-system controllers SC1 to SC4 transmit a combustion operation permit command at the specified hot water supply temperature of the individual water heaters WH1 to WH16.

In this manner, the sub-system controllers SC1 to SC4 resume the tapping operation by control of the number of operating units individually without restriction from the main system controller SC5. At this time, when the faucet is opened and tapping is requested, the tapping operation starts according to the tapping request. This tapping is fixed at the specified hot water supply temperature until the hot water supply temperature is corrected by the remote controller RC after the trouble of the main system controller SC5 is cleared.

D. Restoration Process Function of Data Loss in Main System Controller SC5

This is an explanation of restoration process function of data loss in main system controller SC5.

In the hot water supply system of the invention, as mentioned above, the driving power sources of the main system controller SC5 and sub-system controllers SC1 to SC4 are supplied from different power lines, and if the control data stored in the main system controller SC5 is lost due to momentary failure or other trouble of the power source supplied to the main system controller SC5, for example, the microcomputers 100 and 200 installed in the main system controller SC5 and sub-system controllers SC1 to SC4 execute data restoration process in the following procedure according to the setting of the control program.

That is, when the microcomputer 100 is reset due to momentary failure or the like of the power source supplied to the main system controller SC5, the main system controller SC5 issues an inquiry command to the sub-system controllers SC1 to SC4 about the content of the various commands (control signals) issued by the microcomputer 100 to the sub-system controllers SC1 to SC4 before resetting of the microcomputer 100.

The microcomputer 200 of the sub-system controllers SC1 to SC4 receiving this inquiry command replies the control signal received from the main system controller SC5 before resetting of the microcomputer 100.

On the basis of the reply, the main system controller SC5 acquires the commands issued before resetting of the microcomputer 100 (for example, presence or absence of output of operation start command, or sequence of output of operation command to the sub-system controllers), and stores the obtained data in the microcomputer 100 (the memory, not shown, of the microcomputer).

On the basis of such input data, the microcomputer 100 of the main system controller SC5 specifies the sub-system controllers SC1 to SC4 issuing the operation start command before resetting and the sequence of output, and transmits the operation start commands to the sub-system controllers SC1 to SC4 according to this sequence. That is, the operation start command is issued so as to be in the same state as before resetting of the microcomputer 100.

Therefore, if the data held in the main system controller SC5 is lost, the hot water supply system can be started from the state before the loss, and the opening and closing operations of the flow rate control valve 6 can be minimized, and changes of tapping amount due to opening and closing operations of the flow rate control valve 6 can be kept to a minimum limit.

E. Identifying Function of Defective Water Heater

Figure 10:
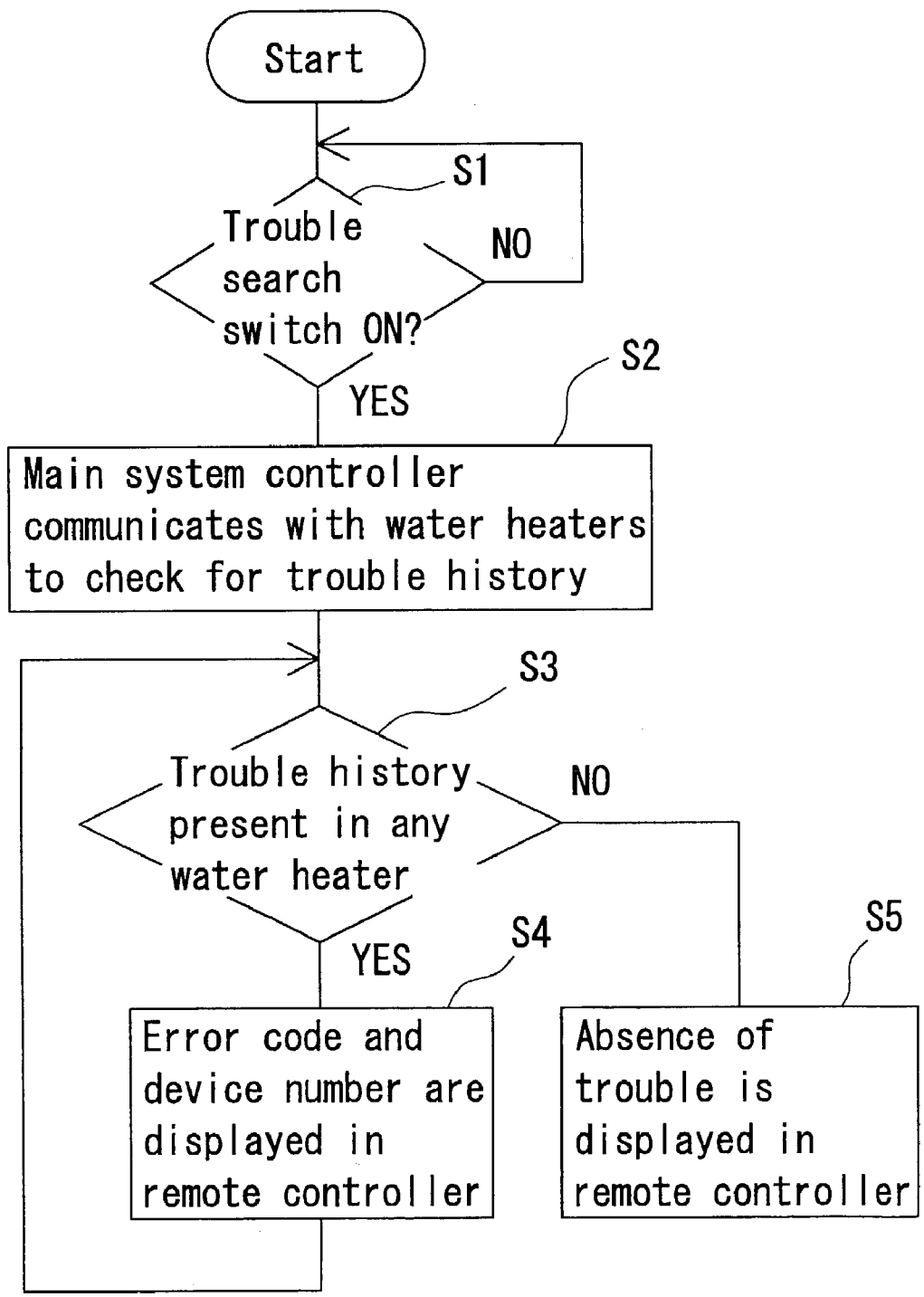
FIG. 10 is a flowchart showing designating procedure of defective water heater in the hot water supply system.

A function of identifying a defective water heater is explained by referring to a flowchart shown in FIG. 10.

This function is to retrieve and display actively a defective water heater by manipulation of the remote controller RC in case the error display shown by the error display function (trouble of water heater) is erased by clearing of the error status of the water heater by subsequent manipulation of the remote controller RC.

This function is executed by changing over the operation mode of the remote controller RC to a specific operation mode (defective device identifying mode) provided for identifying a defective water heater, and manipulating an operation switch (the up switch 12 in the illustrated example) assigned as an operation switch for trouble retrieval in this mode (S1 in FIG. 10).

More specifically, by manipulation of the up switch (operation switch for trouble retrieval) 12, the remote controller RC issues a command (retrieval start command) for ordering execution of retrieval start process of the defective water heater to the microcomputer 100 of the main system controller SC5.

The main system controller SC5, being triggered by this retrieval start command, starts communication for checking for presence or absence of trouble of individual water heaters WH1 to WH16 by way of the sub-system controllers SC1 to SC4 (S2 in FIG. 10). Specifically, this communication is intended to inquire the individual water heaters WH1 to WH16 about presence or absence of trouble history.

Herein, the trouble history is the data of history of occurrence of troubles recorded by the control unit 7 in each water heater, and the data includes error codes identifying the nature (type) of trouble. The trouble history is stored in the memory device (not shown) of the control unit 7 of each water heater, and the data is accumulated and stored on every occasion of trouble.

To this inquiry, if presence of trouble is replied from any water heater, that is, if a trouble history is present in any water heater (S3 in FIG. 10), the main system controller SC5 identifies the water heater having trouble history on the basis of the device identification information additionally transmitted from the sub-system controllers SC1 to SC4 together with the trouble history, and the result is transmitted to the remote controller RC, and the device No. and error code of the defective water heater are displayed in the display unit 20 (S4 in FIG. 10).

At this time, the main system controller SC5 stores the data for identifying the trouble (specifically, the fault identification data composed of device identification information and error code) in the specified memory device (memory means) 106 provided in the main system controller SC5, parallel to the display process, as the data for executing the operation restoring function described below.

Trouble is not replied from any water heater, that is, trouble history is not present in any water heater, on the other hand, the process goes to step S5 in FIG. 10, and the display panel 21 of the remote controller RC shows none of the water heaters is defective.

Thus, as being triggered by manipulation of operation switch for trouble retrieval, the main system controller SC5 communicates with the individual water heaters WH1 to WH16, and a defective water heater is identified and displayed, and therefore if multiple water heaters are present under the control of the main system controller SC5, a defective water heater can be identified in a short time. Thus, the time and labor spent for maintenance and repair of the hot water supply system can be saved substantially.

In the shown embodiment, as the trigger for starting trouble retrieval, a retrieval start command signal issued by manipulation of the up switch 12 is used, but it may be also designed to trigger automatically in several seconds when the operation mode of the remote controller RC is changed to a specific mode (for example, a monitor mode for monitoring the operating status of water heater). In the embodiment, the operation switch for trouble retrieval is provided in the remote controller RC, but this operation switch for trouble retrieval may be provided in the main system controller SC5.

F. Operation Restoring Function of Defective Water Heater

Figure 11:
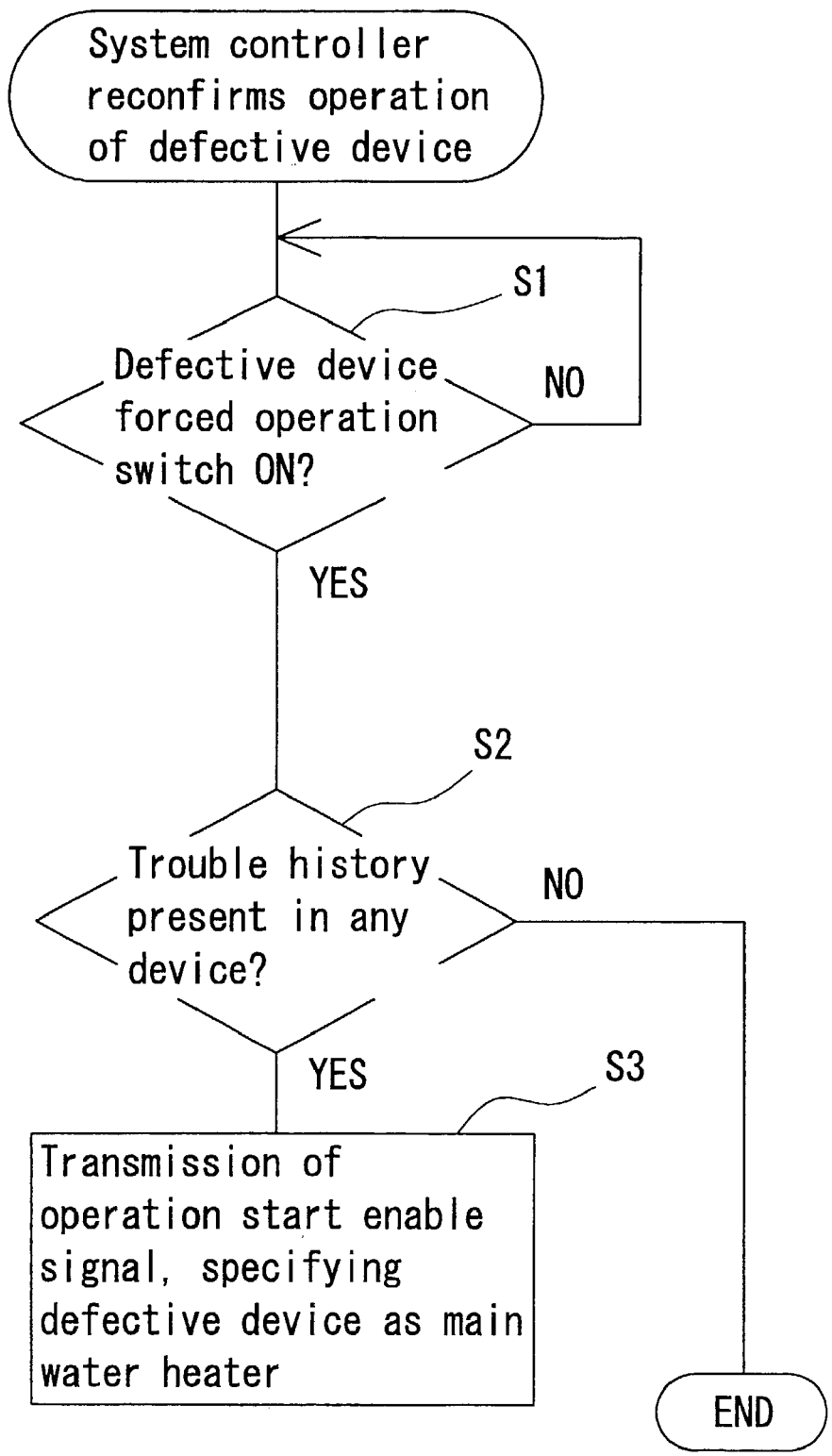
FIG. 11 is a flowchart showing operation recovery procedure of defective water heater in the hot water supply system.

An operation restoring function of a defective water heater is explained by referring to a flowchart in FIG. 11.

This operation restoring function is to restore the status at the moment of occurrence of trouble by operating the defective water heater by force.

In the hot water supply system of this embodiment, the water heater to be put in action in the first place upon start of tapping (hereinafter called main water heater) is determined by the software of the sub-system controller SC1 provided with an operation start command at the beginning. Therefore, in the second and subsequent water heaters put in action, to restore the status of trouble, setting of the software of the sub-system controller SC1 must be changed.

In the hot water supply system of the embodiment, this setting change operation can be executed by manipulation of the specified operation switch (in this embodiment, the operation switch 107 for forced operation of defective device provided on the main system controller SC5) (S1 in FIG. 11).

That is, when the operation switch 107 is manipulated (Yes at S1 in FIG. 11), the defective water heater is identified in the main system controller SC5. In this identifying process, being triggered by manipulation of the operation switch 107, the microcomputer 100 of the main system controller SC5 reads out the trouble history stored in the water heaters through communication with the water heaters WH1 to WH16, or reads out the defective device identification data stored in the memory device 106 (S2 in FIG. 11).

When the defective water heater (for example, WH7) is thus identified, the main system controller SC5 commands change of setting of main water heater to the water heater WH7 to the microcomputer 200 of the sub-system controller SC2 to which the defective water heater WH7 is connected, and transmits an operation enable command to the sub-system controller SC2, and issues operation ban commands to the other sub-system controllers SC1, SC3, and SC4 (S3 in FIG. 11).

In this state, when the faucet 2 is opened, the defective water heater is put in action prior to the other water heaters, and the operation of the defective water heater is reproduced. In the absence of trouble history (No at S2 in FIG. 11), forced operation of water heater is not executed, and the operation reproduction confirming process is terminated.

Thus, by manipulation of the operation switch 107, the main system controller SC5 changes the setting of the main water heater automatically, and the defective water heater is put in action preferentially, so that the time and labor spent for operation reproduction confirmation of water heater can be substantially saved.

In this embodiment, the operation switch 107 for defective device forced operation is provided in the main system controller SC5, but this operation switch 107 may be provided in the remote controller RC. In such a case, interlocking with the operation mode of the remote controller RC, an existing switch (for example, up switch 12) may be used as operation switch for defective device forced operation.

G. Alarm Output Function of Trouble in Water Heater

Figure 12:
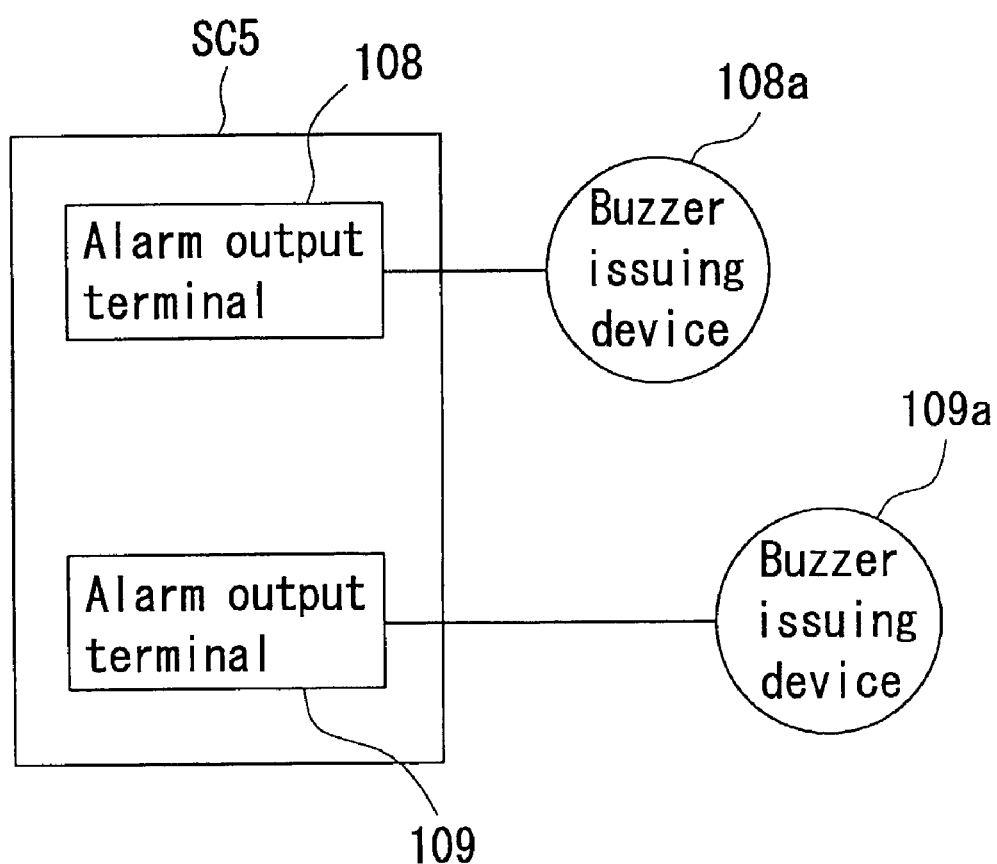
FIG. 12 is a block diagram showing a schematic configuration of alarm output unit in the hot water supply system.
Figure 13:
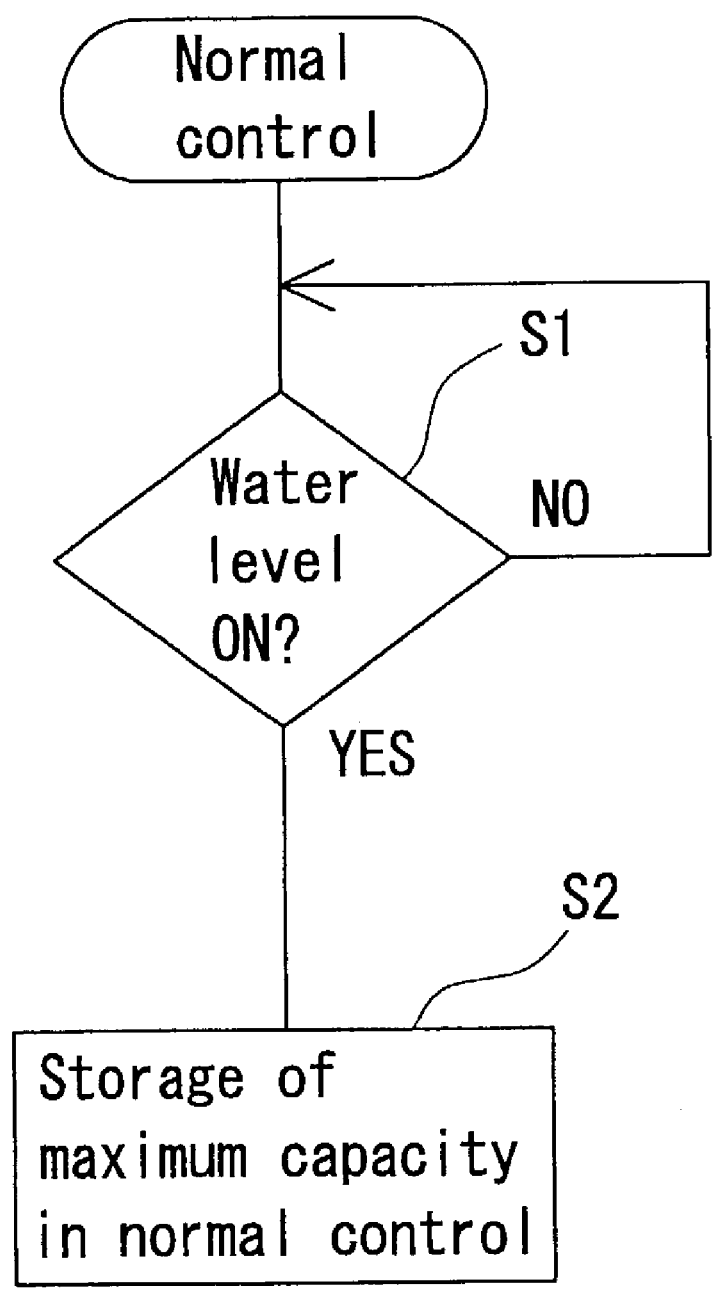
FIG. 13 is a flowchart showing an example of pretreatment procedure of alarm output in the hot water supply system.
Figure 14:
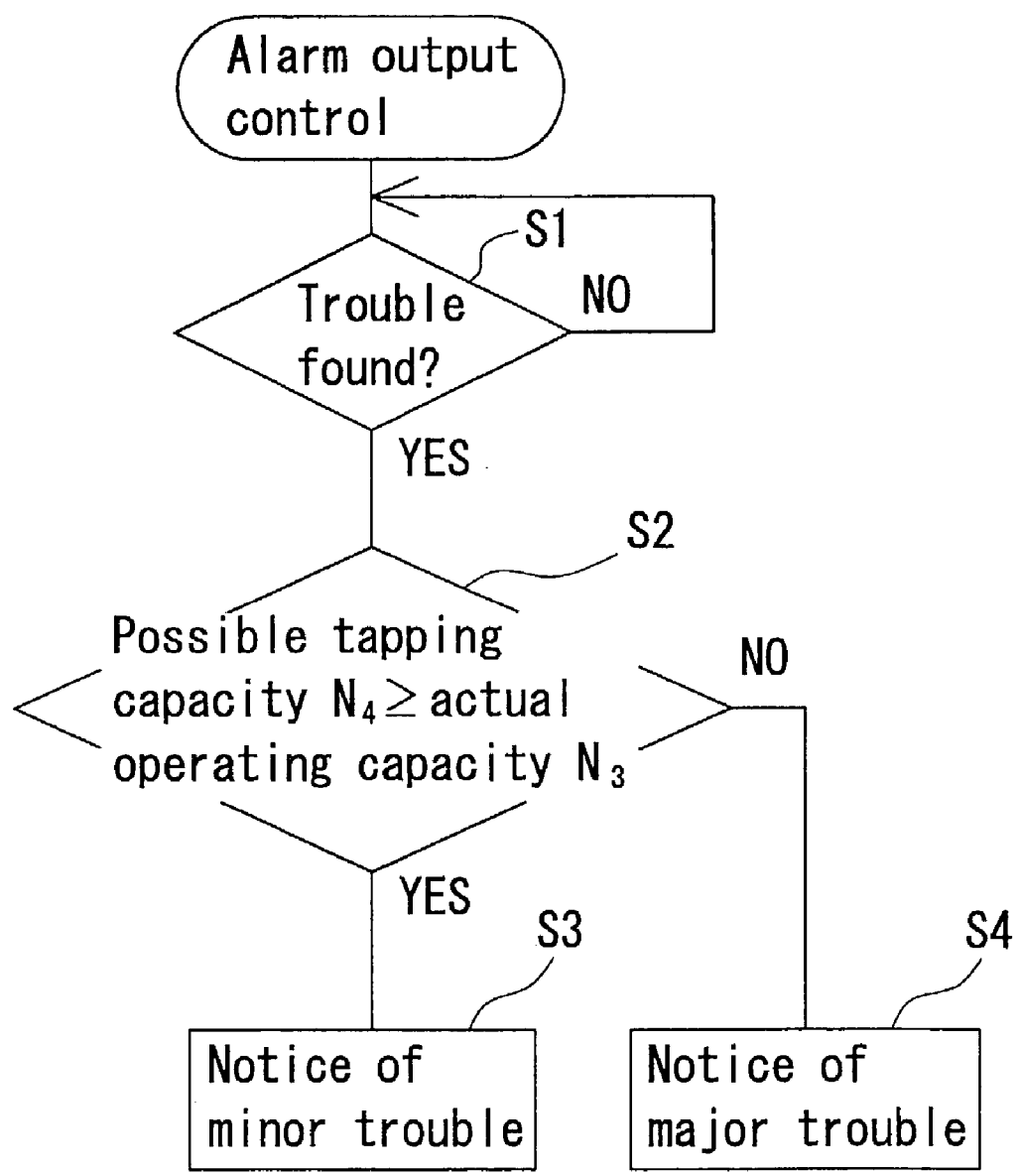
FIG. 14 is a flowchart showing an example of alarm output procedure in the hot water supply system.
Figure 15:
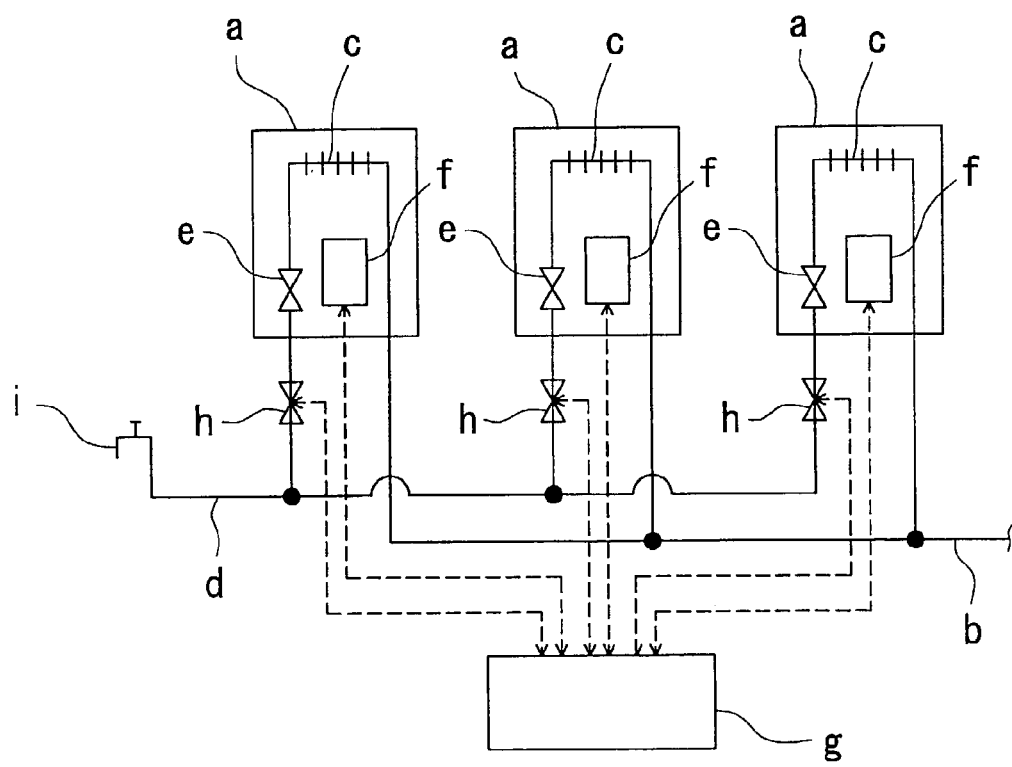
FIG. 15 is an explanatory diagram showing a schematic configuration of a conventional hot water supply system.

An alarm output function of trouble in a water heater is explained by referring to FIG. 12 to FIG. 14.

This function is to inform by changing the alarm sound issued from the alarm device depending on the type of trouble in the event of an alarm occurring in anyone of the water heaters WH1 to WH16.

Relating to this function, the main system controller SC5 has a plurality of (two in the illustrated example) alarm output terminals 108, 109 as shown in FIG. 12. These alarm output terminals 108, 109 are connected to alarm devices 108a, 109a issuing difference alarm sounds. The alarm devices 108a, 109a are buzzer devices making different buzzer sounds.

These alarm output terminals 108, 109 are controlled as follows by the microcomputer 100 of the main system controller SC5.

As the preliminary condition for the control, a specified memory device of the main system controller SC5 stores the nominal tapping capacity values $N_1$ of the water heaters WH1 to WH16, and the nominal total tapping capacity value of the entire water supply system $N_2$ (the total of the nominal tapping capacity values $N_1$ of the water heaters WH1 to WH16). These nominal tapping capacity values $N_1$, and $N_2$ are preferably acquired automatically in the main system controller SC5 by data communications between the main system controller SC5 and the water heaters WH1 to WH16 and the cumulative processing of the data communication results, but may be also entered manually.

On the other hand, the memory device also stores the actual tapping capacity value (actual operating capacity value) $N_3$ usually required in the hot water supply system in the normal state of the hot water supply system, that is, the actual operating record of the hot water supply system while the water heaters WH1 to WH16 are all normal.

The actual operating capacity value $N_3$ can be set appropriately, but in this embodiment according to the procedure shown in FIG. 13, during the operation of the hot water supply system (Yes at S1 in FIG. 13), the total tapping capacity is calculated in the main system controller SC5, and its maximum value is stored and used as the actual operating capacity value $N_3$ (see S2 in FIG. 13).

When a trouble is detected in any one of the water heaters WH1 to WH16 by the main system controller SC5 (Yes at S1 in FIG. 14), the main system controller SC5 determines a possible tapping capacity value $N_4$ by the other normal water heaters excluding the defective water heater, and compares this possible tapping capacity value $N_4$ and the actual operating capacity value $N_3$ (S2 in FIG. 14).

Herein, the possible tapping capacity value $N_4$ is determined by subtracting the tapping capacity value $N_1$ of the defective water heater (if plural water heaters are defective, the total of the tapping capacity values $N_1$) from the nominal tapping capacity value $N_2$ of the entire hot water supply system.

As a result of comparison, in the case of possible tapping capacity value $N_4$>actual operating capacity value $N_3$, that is, when the possible tapping capacity value $N_4$ is more than the actual operating capacity value $N_3$, the operation of the hot water supply system can be continued (that is, the trouble is slight enough to allow to continue the operation of the hot water supply system), and in this case an alarm signal is issued from the alarm output terminal 108 (S3 in FIG. 14).

On the other hand, as a result of the above judgement, in the case of possible tapping capacity value $N_4$<actual operating capacity value $N_3$, that is, when the actual operating capacity value $N_3$ is more than the possible tapping capacity value $N_4$, normal tapping is not possible if the operation of the hot water supply system is continued (this is a major trouble immediately requiring repair), and in this case an alarm signal is issued from the alarm output terminal 109 (S4 in FIG. 14).

The judgement at step S2 in FIG. 14 is executed all the time or repeatedly while the main system controller SC5 is detecting trouble of water heater, but even in the case of minor trouble, if the actual operating capacity value $N_3$ exceeds the possible tapping capacity value $N_4$ later, the judgement is changed to major trouble.

Thus, in this embodiment, the alarm output in case of trouble of water heater can be issued in two manners whether the tapping operation can be continued or not, the system manager can immediately judge whether repair is necessary or not by hearing the alarm sound issued from the alarm device 108a or 109a.

In the embodiment, the alarm sound is classified into minor trouble and major trouble as alarm modes (trouble informing modes), but alarm modes may be further classified into more than two types to inform depending on the degree of trouble. In the embodiment, the alarm mode is changed over depending on whether the tapping operation can be continued or not, but the alarm mode may be also changed over by other condition. The alarm device in the embodiment is the buzzer issuing device, but aside from the buzzer, a musical melody or other sound may be also issued as the alarm sound from the alarm device.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A hot water supply system operated by linking plural water heaters, comprising:
   system controllers centralizing controls of a group of water heaters, and
   host system controllers centralizing controls of a group of system controllers,
   wherein said host system controllers are disposed hierarchically so that the controllers may be finally centralized in a single highest host system controller, and the highest host system controller controls the operation of individual water heaters through the lower system controllers,
   wherein said lower system controllers to which water heater are connected are designed to increase or decrease the number of operating units of a group of water heaters under the control depending on the tapping request, while the highest host system controller controls the number of operating units of water heaters in the entire system by increasing or decreasing the number of operating units of lower system controllers and
   wherein said highest system controller controls to determine the operation stopping timing of the water heaters centralized by one lower system controller, depending on the number of operating units of water heaters centralized by other lower system controllers.

2. The hot water supply system of claim 1,
   wherein the control of the number of operating units of water heaters in the lower system controllers is executed by controlling passing of water to the water heaters by opening or closing the valves attached to the water heaters.

3. The hot water supply system of claim 1,
   wherein the number of water heaters to be operated at the beginning of tapping is freely determined in the lower system controllers.

4. The hot water supply system of claim 1,
   wherein said highest system controller prohibits operation of other lower system controllers when operating a specific lower system controller, and control to stop operation of the water heaters under the control of the prohibited system controllers.

5. The hot water supply system of claim 1,
   wherein said highest system controller has display means for displaying the information of water heaters and/or other system controllers.

6. The hot water supply system of claim 5,
   wherein said display means is provided in a remote controller incorporated in the highest system controller.

7. The hot water supply system of claim 5 or 6,
   wherein said lower system controllers accumulate the total tapping capacity of individual connected water heaters to transmit to a higher system controller, and the higher system controller accumulates the cumulative values of tapping capacity transmitted from the lower system controllers to transmit to a still higher system controller, and the tapping capacity of the entire system is calculated in the highest system controller, and the result is displayed in the display means.

8. The hot water supply system of claim 5 or 6,
   wherein said lower system controllers accumulate the number of water heaters in operation to transmit to a higher system controller, and the higher system controller accumulates the cumulative values of the number of water heaters in operation transmitted from the lower system controllers to transmit to a still higher system controller, and the total number of water heaters in operation of the entire system is calculated in the highest system controller, and the result is displayed in the display means.

9. The hot water supply system of claim 5 or 6,
wherein said lower system controllers accumulate the number of connected water heaters to transmit to a higher system controller, and the higher system controller accumulates the cumulative values of the number of connected water heaters transmitted from the lower system controllers to transmit to a still higher system controller, and the total number of connected water heaters of the entire system is calculated in the highest system controller, and the result is displayed in the display means.

10. The hot water supply system of claim 9,
wherein said highest system controller has memory means for storing the maximum value of the cumulative values of the number of connected water heaters transmitted from the lower system controllers, and the number of connected water heaters is displayed by the display means together with the maximum number of connected water heaters stored in this memory means.

11. The hot water supply system of claim 9,
wherein said lower system controller, when receiving an error code showing the type of trouble from a connected water heater, transmits this error code to the highest system controller together with the device identification information attached to the error code by way of a higher system controller, and the defective water heater and type of trouble are specified in the highest system controller, and the results are displayed in the display means.

12. The hot water supply system of claim 1,
wherein said highest system controller and lower system controllers are designed to receive power supplies from different power sources.

13. The hot water supply system of claim 1,
wherein said highest system controller has at least two trouble alarm means, and controls to change over these trouble alarm means depending on the status of trouble of the water heaters.

14. The hot water supply system of claim 13,
wherein said trouble alarm means are changed over depending on the degree of trouble of water heaters.

15. A hot water supply system operated by linking plural water heaters, comprising:
system controllers centralizing controls of a group of water heaters, and
host system controllers centralizing controls of a group of system controllers,
wherein said host system controllers are disposed hierarchically so that the controllers may be finally centralized in a single highest host system controller, and the highest host system controller controls the operation of individual water heaters through the lower system controllers,
wherein said lower system controllers to which water heaters are connected are designed to increase or decrease the number of operating units of a group of water heaters under the control depending on the tapping request, while the highest host system controller controls the number of operating units of water heaters in the entire system by increasing or decreasing the number of operating units of lower system controllers and
wherein said highest system controller controls to prohibit the adjustment of flow rate of the water heaters centralized by one lower system controller, depending on the number of operating units of water heaters centralized by other lower system controllers.

16. A hot water supply system operated by linking plural water heaters, comprising:
system controllers centralizing controls of a group of water heaters, and
host system controllers centralizing controls of a group of system controllers,
wherein said host system controllers are disposed hierarchically so that the controllers may be finally centralized in a single highest host system controller, and the highest host system controller controls the operation of individual water heaters through the lower system controllers,
wherein said highest system controller has means for detecting at least one of trouble of remote controller connected to the system controllers and communication failure with the remote controller, and
the highest system controller controls to fix the hot water supply temperature of all water heaters of the system at a specified temperature when one of these troubles are detected by said detecting means.

17. A hot water supply system operated by linking plural water heaters, comprising:
system controllers centralizing controls of a group of water heaters, and
host system controllers centralizing controls of a group of system controllers,
wherein said host system controllers are disposed hierarchically so that the controllers may be finally centralized in a single highest host system controller, and the highest host system controller controls the operation of individual water heaters through the lower system controllers,
wherein said highest system controller has means for detecting at least one of trouble of the lower system controllers and communication failure with the lower system controllers, and
the highest system controller controls to exclude the abnormal lower system controller having trouble or communication failure when one of these troubles are detected by said detecting means, and to control the number of operating units of water heaters by using the remaining lower system controllers.

18. A hot water supply system operated by linking plural water heaters, comprising:
system controllers centralizing controls of a group of water heaters, and
host system controllers centralizing controls of a group of system controllers,
wherein said host system controllers are disposed hierarchically so that the controllers may be finally centralized in a single highest host system controller, and the highest host system controller controls the operation of individual water heaters through the lower system controllers,
wherein said lower system controllers have means for detecting at least one of trouble of the highest system controller and communication failure with the highest system controller, and the lower system controllers control to instruct all connected water heaters to ban combustion and stop tapping when one of these troubles are detected by said detecting means.

19. A hot water supply system operated by linking plural water heaters, comprising:
   system controllers centralizing controls of a group of water heaters, and
   host system controllers centralizing controls of a group of system controllers,
   wherein said host system controllers are disposed hierarchically so that the controllers may be finally centralized in a single highest host system controller, and the highest host system controller controls the operation of individual water heaters through the lower system controllers,
   wherein said lower system controllers have means for detecting at least one of trouble of the highest system controller and communication failure with the highest system controller, and
   the lower system controllers control to fix the hot water supply temperature of all connected water heaters at a specified temperature when one of these troubles are detected by said detecting means.

20. A hot water supply system operated by linking plural water heaters, comprising:
   system controllers centralizing controls of a group of water heaters, and
   host system controllers centralizing controls of a group of system controllers,
   wherein said host system controllers are disposed hierarchically so that the controllers may be finally centralized in a single highest host system controller, and the highest host system controller controls the operation of individual water heaters through the lower system controllers,
   wherein said water heaters have means for detecting at least one of trouble of the lower system controllers and communication failure with the lower system controllers, and
   the water heaters control to ban combustion and stop tapping when one of these troubles are detected by said detecting means.

21. A hot water supply system operated by linking plural water heaters, comprising:
   system controllers centralizing controls of a group of water heaters, and
   host system controllers centralizing controls of a group of system controllers,
   wherein said host system controllers are disposed hierarchically so that the controllers may be finally centralized in a single highest host system controller, and the highest host system controller controls the operation of individual water heaters through the lower system controllers,
   wherein said highest system controller, when data held for control of number of operating units of water heaters is lost, requests the lower system controllers to transmit the control data held in the lower system controllers, and controls to execute the process of restoring the system in the state before loss of data on the basis of the data transmitted from the lower system controllers according to this transmission request.

22. A hot water supply system operated by linking plural water heaters, comprising:
   system controllers centralizing controls of a group of water heaters, and
   host system controllers centralizing controls of a group of system controllers,
   wherein said host system controllers are disposed hierarchically so that the controllers may be finally centralized in a single highest host system controller, and the highest host system controller controls the operation of individual water heaters through the lower system controllers,
   wherein said highest system controller, when data held for control of the number of operating units of water heaters is lost, requests the lower system controllers to transmit the control data held in the lower system controllers, and controls to execute the process of restoring the system in the state before loss of data on the basis of the data transmitted from the lower system controllers according to this transmission request, and
   wherein said lower system controllers are designed to receive power supplies from any one of the water heaters connected to these system controllers.

23. A hot water supply system operated by linking plural water heaters, comprising:
   system controllers centralizing controls of a group of water heaters, and
   host system controllers centralizing controls of a group of system controllers,
   wherein said host system controllers are disposed hierarchically so that the controllers may be finally centralized in a single highest host system controller, and the highest host system controller controls the operation of individual water heaters through the lower system controllers,
   wherein said highest system controller has display means for displaying the information of water heaters and/or other system controllers, and
   wherein said highest system controller communicates with the water heaters connected to the lower system controllers to check for trouble in the condition of input of a specific trigger, and controls to display the information specifying the corresponding water heater in the display means when information of trouble is returned from any water heater.

24. A hot water supply system operated by linking plural water heaters, comprising:
   system controllers centralizing controls of a group of water heaters, and
   host system controllers centralizing controls of a group of system controllers,
   wherein said host system controllers are disposed hierarchically so that the controllers may be finally centralized in a single highest host system controller, and the highest host system controller controls the operation of individual water heaters through the lower system controllers,
   wherein said highest system controller has display means for displaying the information of water heaters and/or other system controllers
   wherein said display means is provided in a remote controller Inc. in the highest system controller, and
   wherein said highest system controller communicates with the water heaters connected to the lower system controllers to check for trouble in the condition of input of a specific trigger, and controls to display the information specifying the corresponding water heater in the display means when information of trouble is returned from any water heater.

25. The hot water supply system of claim 23 or 24,
wherein said highest system controller main body or its remote controller has operating means for generating the specific trigger.

26. The hot water supply system of claim 23 or 24,
wherein said highest system controller has memory means for storing the information specifying the corresponding water heater when information of trouble is returned from any water heater.

27. A hot water supply system operated by linking plural water heaters, comprising:
system controllers centralizing controls of a group of water heaters, and
host system controllers centralizing controls of a group of system controllers,
wherein said host system controllers are disposed hierarchically so that the controllers may be finally centralized in a single highest host system controller, and the highest host system controller controls the operation of individual water heaters through the lower system controllers,
wherein said highest system controller, when data held for control of the number of operating units of water heaters is lost, requests the lower system controllers to transmit the control data held in the lower system controllers, and controls to execute the process of restoring the system in the state before loss of data on the basis of the data transmitted from the lower system controllers according to this transmission request,
wherein said lower system controllers are designed to recieve power supplies from any one of the hot water heaters connected to the system controllers, and
wherein said highest system controller controls to specify a defective water heater from the water heaters connected to the lower system controllers in the condition of input of a specific trigger, and operate the specified water heater by setting this specified water heater as the first water heater to be operated at the beginning of tapping.

28. A hot water supply system operated by linking plural water heaters, comprising:
system controllers centralizing controls of a group of water heaters, and
host system controllers centralizing controls of a group of system controllers,
wherein said host system controllers are disposed hierarchically so that the controllers may be finally centralized in a single highest host system controller, and the highest host system controller controls the operation of individual water heaters through the lower system controllers,
wherein said highest system controller, when data held for control of the number of operating units of water heaters is lost, requests the lower system controllers to transmit the control data held in the lower system controllers, and controls to execute the process of restoring the system in the state before loss of data on the basis of the data transmitted from the lower system controllers according to this transmission request,
wherein said lower system controllers are designed to receive power supplies from any one of the hot water heaters connected to the system controllers,
wherein said highest system controller controls to specify a defective water heater from the water heaters connected to the lower system controllers in the condition of input of a specific trigger, and operate the specified water heater by setting the specified water heater as the first water heater to be operated at the beginning of tapping, and
wherein said highest system controller main body or its remote controller has operating means for generating the specific trigger.

29. A hot water supply system operated by linking plural water heaters, comprising:
system controllers centralizing controls of a group of water heaters, and
host system controllers centralizing controls of a group of system controllers,
wherein said host system controllers are disposed hierarchically so that the controllers may be finally centralized in a single highest host system controller, and the highest host system controller controls the operation of individual water heaters through the lower system controllers,
wherein said highest system controller has at least two trouble alarm means, and controls to change over these trouble alarm means depending on the status of trouble of the water heaters,
wherein said trouble alarm means are changed over depending on the degree of trouble of water heaters and
wherein said highest system controller judges the degree of trouble by comparing the possible tapping capacity value by the normally operating water heaters and the actual operating capacity value obtained from the past results, and controls to judge to be a major trouble when the actual operating capacity value exceeds the possible tapping capacity value, and judge to be a minor trouble otherwise.

* * * * *